(12) United States Patent
MacNaughton et al.

(10) Patent No.: US 9,399,171 B2
(45) Date of Patent: Jul. 26, 2016

(54) ELECTRONIC GAMING AND ADVERTISING METHOD USING PROXIMATE PERSONAL DEVICES

(71) Applicant: 101210135 Saskatchewan Ltd., Regina (CA)

(72) Inventors: Michael MacNaughton, Regina (CA); Leif Kaldor, Regina (CA)

(73) Assignee: 101210135 Saskatchewan Ltd., Regina (CA)

( * ) Notice: Subject to any disclaimer, the term of this patent is extended or adjusted under 35 U.S.C. 154(b) by 390 days.

(21) Appl. No.: 14/149,107

(22) Filed: Jan. 7, 2014

(65) Prior Publication Data

US 2014/0221095 A1 Aug. 7, 2014

(30) Foreign Application Priority Data

Jan. 7, 2013 (CA) .................................... 2800594

(51) Int. Cl.
| | |
|---|---|
| *A63F 9/24* | (2006.01) |
| *A63F 13/215* | (2014.01) |
| *A63F 13/216* | (2014.01) |
| *A63F 13/332* | (2014.01) |
| *A63F 13/61* | (2014.01) |
| *A63F 13/798* | (2014.01) |

(52) U.S. Cl.
CPC ............. *A63F 13/215* (2014.09); *A63F 13/216* (2014.09); *A63F 13/332* (2014.09); *A63F 13/61* (2014.09); *A63F 13/798* (2014.09)

(58) Field of Classification Search
USPC ...................................................... 463/31–42
See application file for complete search history.

(56) References Cited

U.S. PATENT DOCUMENTS

| | | | | |
|---|---|---|---|---|
| 9,108,107 | B2* | 8/2015 | Perlman .................. | A63F 13/12 |
| 2009/0305788 | A1* | 12/2009 | Bronstein ............... | A63F 13/10 463/42 |
| 2013/0244784 | A1* | 9/2013 | Assa ..................... | G06F 3/0488 463/40 |
| 2014/0243094 | A1* | 8/2014 | Tayloe .................. | A63F 13/795 463/42 |
| 2014/0274359 | A1* | 9/2014 | Helava ................... | A63F 13/00 463/29 |
| 2014/0274371 | A1* | 9/2014 | Helava ................... | A63F 13/10 463/31 |

* cited by examiner

*Primary Examiner* — Masud Ahmed
(74) *Attorney, Agent, or Firm* — Trego, Hines & Ladenheim, PLLC; Brandon Trego; Jonathan Hines

(57) ABSTRACT

A method of gaming between multiple participants, each of whom has a locationally aware smart phone or similar user device with a microphone and at least one speaker, capable of a triggering interaction with other such devices using a sound-based trigger. A gaming session is triggered by the playing of an acoustic gaming session request tone by a first device. Software on other user devices within acoustic listening range which "hear" the trigger tone can cause the listening devices to join a gaming session with the first user device through contact with a centrally administered gaming application on a server. Based on the geographic location of the gaming session, or other applicable user parameters, at least one game or contest from the server is made available and can then be selected and played between the connected user devices, served by the central system. Advertising content relevant to the location or other user parameters of the user of each user device in the gaming session will be served to the user devices during or after completion of the gaming session.

32 Claims, 9 Drawing Sheets

ELECTRONIC GAMING AND ADVERTISING METHOD USING PROXIMATE PERSONAL DEVICES

This invention is in the field of electronic advertising and media delivery, and more specifically deals with the provision of an online advertising method that will incorporate the provision of games or contests to multiple locationally proximate user devices, during which time relevant advertising material can be provided.

BACKGROUND OF THE INVENTION

There have been over the past number of years many developments in the delivery of electronic or online advertising. The revenue models of many ecommerce and social networking and other related websites, having now established or built out a user base, are reliant in varying degrees upon advertising sales and revenue, and developing or expanding the advertising revenue base is a key part of the commercial success of those entities.

As a baseline, website and online advertising has been mature for some time in terms of the basic presentation of advertisements, coupons or other advertising materials in static fashion via web interfaces or the other app interfaces of the underlying sites. Hyperlinking or provision of other direct or passthrough access to advertisements has been done in the context of web and app development for some time, and it is upon this basic concept that many of the alterations or additive methods created by online content providers to make their advertising content more relevant or otherwise more consumed or consumable have been based.

One of the traditional methods, online or otherwise, in terms of making advertising more consumable to the selected user audience is to target the content or availabliity of that advertising more carefully to its desired audience. For example, in the context of many web sites or other online businesses one of the primary ways they first started to make their displayed advertising more relevant to a consuming user was to target the material which is displayed to the user based on location details or other preferences stored within that user's user profile on a website. This allowed for example for a sales web site to display pricing or availability, or other advertising information related to certain products or services, to a logged in user based that user's preferences stored within their profile on that website. Making a consolidated user preference log or profile available to many websites related to a single user is one of the limitations which would have been first experienced in this type of approach, but this did provide a starting point in terms of the rendering of user-targeted advertising material. An extension of this user profile preference targeting method for ecommerce websites was also to track website interactions of the user in relation to their profile such that for example where a sales website tracked that a particular user had browsed a particular category of goods or services, advertising or offers related to that area could be displayed. Many fairly elaborate methods of user profile/preference targeting have now been developed and are used by many online businesses in this fashion.

A next step in the evolution of targeted online advertising has been enabled with the proliferation in smart phones and other web enabled personal devices through which website and other related categories of electronic content can be accessed and consumed. Wide availability of smart devices which include GPS or other location technology, allowing for the use of the devices location by developers in development of software therefore, has made the targeting of advertising even more possible and accurate, since the location of the browsing device can be used to match up advertising content as it is displayed to be most geographically relevant. For example by knowing the location of your device, an advertising server could serve coupons or advertisements for the closest restaurant or business in a selected category, even along with directions or other locational information. Availability of locationally aware devices has made targeted display of advertising material much more useful in a business context since it can provide an additional level of granularity in the drive which can be accomplished to the advertising of a particular vendor. Even beyond ecommerce websites, in the context of social networking applications, social networking interfaces can be developed which show or provide interaction with the "closest" of your friends.

Use of user profile preferences, along with geographic location data, are two key concepts in the delivery of targeted advertising which it is believed can be built upon in the context of the present invention in the provision of a new advertising method.

The second general concept or direction in online business models which it is desired to evolve or expand in the context of the present invention is the incorporation of social networks more deeply into many online business models, and into the online interactions and lives of many smart phone or online users. The use by most people in the 18-40 age demographic of multiple social networks in their daily lives makes it more interesting and important to try and develop advertising methods which can use the content in a consumer's social network as another potential component in the delivery of targetted advertising material. Social networking websites and providers have invested significant resources in the development of targeted advertising methods based upon the large amounts of user profile and preference data that they accumulate. For example, advertising selected based upon this deep user profile and history data is or can be displayed to a user in the context of their social network interaction experience.

In addition to the relevance of social network contents as another layer of targeting accuracy in the delivery of advertising material, the provision of opportunities for display of commercial advertising material which have the look and feel or interface of social networks may make the advertising material displayed or provided more consumed. Social networking sites such as Facebook have, as a part of their revenue model, developed and provided gaming platforms on which they or third parties have or can develop games and other applications which can, in whatever permissible fashion is provided vis-a-vis the underlying user profile(s), allow for multiple users to play such games or interact through these systems. Widespread use and acceptance of games and similar apps deployed upon these social network platforms provides it is beleived an opportunity for an alternate advertising method which would incorporate many of these concepts.

A "fun" approach to the provision of relevant locationally targeted advertising or similar information, which took a look and feel approach which is similar to user-accepted social network gaming apps, would it is thought be widely accepted by users and is beleived would be welcomed by advertisers as well who be eager to participate in the provision of their advertising media using such a method and platform.

SUMMARY OF THE INVENTION

As outlined above, the present invention provides an electronic advertising method which allows for the delivery of locationally relevant advertising media and material within the context of a gaming application between multiple user devices. The method of display of the advertising content takes place within the context of a gaming session, in which a game or contest is provide for access to the users of physically proximate user devices within a gaming session which is triggered by an acoustic interaction between those user devices. By holding the devices within acoustic range, the transmission of a gaming session request acoustic tone, with or without addition information encoded therein, can be received by other user devices within acoustic range and a gaming session requested and commenced.

A gaming session in accordance with the method, which would result at the end of the day in the provision of advertising media such as coupons or the like, is initiated by physical proximity and acoustic contact between the user devices of at least two users. During a physical proximity and acoustic interaction between at least two user devices, a gaming session request would be transmitted to a gaming engine software resident on the server which was accessible to the user devices by network connection. On receipt of a gaming session request, the gaming engine software would provision a gaming session, such that it could serve or administer a particular contest or game to the user devices connected within the session. The gaming session request as transmitted would include the physical location of each user device. This would be useful both for the purpose of understanding the proximity of the devices from a pairing perspective but also it is key insofar as, either during or following the gaming session the objective is to serve locationally relevant advertising media to the users. The advertising media which would be served is selected based upon the physical location of the user devices in the session.

A plurality of games or contests could be provided. For each game or contest, there would be a contest package stored within a contest database, which had the necessary media and processor instructions, etc. for the server and related components to administer the game or contest to the user devices. Each contest package could have at least one set of contest geofence coordinates associated therewith, defining the geographic area within which the contest The game or contest could be selected, either by user intervention or automatically by the software on the server. Available games or contests from which the game to be played would be chosen could be limited or selected based on user attributes or other criteria.

Within the gaming session, content would be served to the user interface of the user devices. Following the completion of the contest, advertising media could be chosen from an advertising database based upon the physical location of the user devices as well as other user or game attributes. A gaming session, triggered by a physical device interaction, followed by the provision of locationally relevant advertising content is at the heart of the present invention.

A user profile could also be stored either locally or on the network with the server with respect to various users and their devices, to further granulate the selection of games or contests, as well as the selection of advertising material.

The method of the present invention also allows for the enforcement of restrictions on gaming availability—for example age restrictions could be placed on particular games or contests or on particular advertising material, or other legal restrictions could also be enforced.

BRIEF DESCRIPTION OF THE DRAWINGS

The present invention is described in further detail below in conjunction with the following Figures, in which the corresponding reference numerals identify corresponding components and method steps.

DETAILED DESCRIPTION OF THE ILLUSTRATED EMBODIMENTS

Figure 1:
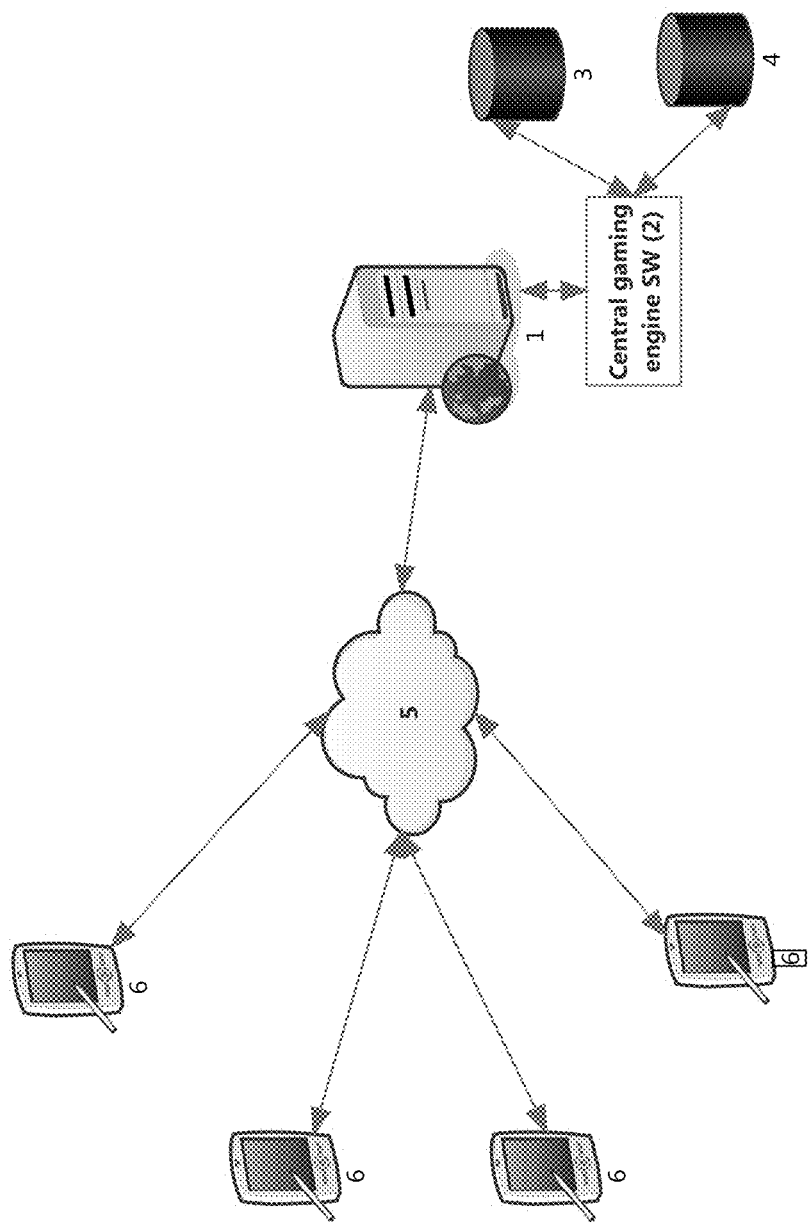
FIG. 1 is a schematic diagram showing one embodiment of an architecture of the system of the present invention which could be used to deploy the gaming and advertising method herein.

As outlined above, the present system is a system and method for the display of locationally relevant advertising content through a social gaming platform, targeted based on the location and other user parameters of user devices within a gaming session. The following sections of the documents are intended to outline in further detail the scope and operation of the present invention.

Acoustic Gaming Session Requests:

The system and method of the present invention incorporates communication between a plurality of user devices on at least one data network to initiate and conduct gaming sessions between groups of user devices that are in close locational proximity. A first user device, being an initiating user device, will broadcast a gaming session request for detection and/or acceptance by other user devices within proximity—if one or more user devices, being joining user devices, accept the broadcast gaming session request, that group of user devices together will participate in a contest in accordance with the remainder of the present invention at their user devices, during or following which locationally relevant or otherwise targeted advertising material will also be displayed.

Many different kinds of an initiating broadcast can be contemplated, to commence the creation of a gaming session between a plurality of locationally proximate user devices. A physical interaction of some kind between the user devices lands and added element of one or engagement to the contest and the method. For example an NFC communication, a "bump" resulting in an electronic handshake between the devices or the like. What is most specifically contemplated as the physical interaction between the user devices of the present invention for the purposes of engaging in the creation of a gaming session between locationally proximate user devices however is the use of the broadcast of an acoustic gaming request by an initiating user device, which can be detected or heard by listening software on other user devices within acoustic range of the initiating user device, and decoded or interpreted for the purpose of presenting the option of joining a gaming session to one or more joining user devices.

In order to facilitate the use of acoustic gaming requests, it is contemplated that the user devices of the present invention need to be, in addition to locationally aware, capable of generating and broadcasting acoustic information, using a speaker or the like, as well as capable of receiving acoustic information using acoustic listening hardware such as a microphone. Most smart phones or other personal Web-enabled devices now include microphones and speakers such that they would be capable of acoustic listening as well as acoustic generation and broadcast, provided that the necessary additional software was provided within the scope of the present invention. In the generation and broadcast of an acoustic gaming request, an initiating user device could simply broadcast an acoustic tone which was identifiable as a gaming session request to listening software using the acoustic listening hardware of the user device within acoustic range. That tone might be a particular type of a musical note or the like, or there are even other parties who have done work on the encoding of basic bits of digital information within acoustic tones that sound like bird songs or the like. Any type of an acoustic tone or broadcast which could be identified by appropriate listening hardware and software is contemplated within the scope of the present invention. One example of prior art work on the area of the encoding of information in basic acoustic transmissions between mobile devices is PCT application Ser. No. PCT/US2009/055915 by Cook. That particular reference speaks of encoding and otherwise recognizable acoustic signal with what would generally be considered to be an un-perceivable encoded message. Regardless of the perceptive ability of the encoding of a message within a acoustic signal or tone, the use of an acoustic transmission or tone as a triggering tone for a gaming method such as is outlined herein would it is believed to bring an additional element of fun method of seeking out participants for gaming sessions etc. and maximizing the use of the method of the present invention.

Acoustic proximity of user devices 6 in accordance with the remainder of the present invention would likely need to be fairly close—the initiating user device 6 which was to transmit the acoustic gaming session request would likely need to be held up reasonably close to one or more joining user devices, so that the joining user device through its microphone or other hardware and software combination could "hear" the acoustic signal and decode that for use. The transmission of the acoustic gaming session request might be repeated a number of times, to allow a maximum number of acoustically proximate user devices to hear it, or following the joinder of a first joining user device to a gaming session with the server and the initiating user device, based upon the fact that the location of the gaming session would be known to the server, the gaming client software 12 could also provide the ability based on the location of its respective user device to show a list of open or available gaming sessions once they were created, from which the user could select by menu to try and join those sessions.

In basic embodiments of the gaming client software of the present invention, an acoustically transmitted gaming session request might be a static tone or sound which was simply identifiable by listening client software on other user devices and which did not include any specific information regarding a gaming session request, user device or the like. The transmission of such an acoustic gaming session request for identification and receipt by acoustically proximate user devices, in conjunction with the transmission of a gaming session request from the initiating user device to a server which identified the location of the initiating user device and/or included potentially other relevant information or parameters would be the most basic embodiment of the acoustic aspect of the client software and the method of the present invention. Other embodiments of the method of the present invention could, by the attendant modification of the gaming client software which was installed on user devices for use in accordance with the remainder of the present invention, allow for the encoding of certain basic information into the acoustic tone which is transmitted as an acoustic gaming session request. For example, an identifier which identified the transmitting user device would be a logical and reasonably compact packet of information which could be encoded into an acoustic tone using some of these methods, which could then be used once decoded by receiving or listening user device to more accurately or quickly identify to the server the gaming session which it was desired to query or join by that joining user device. Both such approaches are contemplated within the scope of the present invention. Specific approaches to the encoding of information into an acoustic communication or tone for transmission between a transmitting and a listening user device will be understood and can be found in the prior art and is intended within the scope of the overall method of the present invention to rely upon one or more such methods.

Method Overview:

Generally speaking the method of the present invention is a gaming and advertising method between mobile user devices, administered by a gaming engine software on a server. At least two user devices capable or configured for participation in the method of the present invention would be virtually linked together in a gaming session by the gaming engine upon receipt of requests from those devices to do so, and the gaming engine would serve to the user devices and their users the necessary content to administer a contest or game to those users. During or following the contest or game, selected advertising material would be displayed.

As outlined in further detail elsewhere herein, the user devices would each be connected via a wireless data network to the gaming engine software on the server. All of the user devices within a particular gaming session might be connected to the same wireless data network, or in other embodiments or implementations, the server and the gaming engine can be operatively connected to more than one data network so that user devices across multiple data networks could, using the server as a bridge between networks, participate in the games of the present invention without the need to be on the same data network.

It is specifically contemplated that the method of the present invention would serve both game or contest content as well as advertising content that was locationally targeted to the user devices within a gaming session. On that basis, gaming sessions would take place between groupings of user devices that were in reasonably close physical or locational proximity to each other. As is outlined elsewhere herein, the primary means of initiation of a gaming session between a plurality of user devices is contemplated to be acoustic in nature—the transmission of an acoustic gaming session request from the initiating user device which can be "heard" or detected by listening software on one or more listening user devices which can join the gaming session requested by accepting the gaming session request and transmitting an acceptance of the request to the server. Insofar as the method of the present invention would rely on this close quarters acoustic interaction between user devices, the user devices within a particular gaming session which use this acoustic method of triggering the gaming session would need to be within acoustic range of each other, that is to say that an initiating user device would need to be able to acoustically transmit a gaming session request via the speaker or speakers thereon in a way that it could in turn be received or heard by the microphone on a listening user device and decoded for the purpose of potential acceptance of the gaming session request and the initiation of a gaming session between those devices. Acoustic proximity or acoustic range then will become a relevant factor in the distance between user devices within particular gaming sessions.

A gaming session request would be initiated by an initiating user device. The gaming session request would be initiated by the transmission of a gaming session request to the server from the initiating user device which would identify the initiating user device as well as likely identifying the location thereof for the purpose of selection or rendering of locationally relevant contest or advertising material in a resulting gaming session. The gaming session request transmitted from an initiating user device might also include additional contest availability criteria or advertising availability criteria which can be used by the server and the remainder of the method of the present invention to further refine the types of contest or advertising material which would be presented to a user or user group of one or a plurality of user devices within a gaming session. For example, the age of the user might become relevant if certain types of contests or advertising could only be shown to individuals of a certain age or the like, and these additional contest or advertising availability criteria could be included in the gaming session request transmitted from the initiating user device to the server.

Coincident with the transmission of a gaming session request including this information from an initiating user device to the server, the physical manifestation of the request for a gaming session with local devices would be the transmission using the acoustic generating hardware of the initiating user device of an acoustic gaming session request. As outlined, the acoustic gaming session request could be a standard or static acoustic tone which was recognizable to a listening device in acoustic proximity, or in other embodiments the acoustic gaming session request could actually be an acoustic tone with certain basic gaming request information encoded therein. In any event the initiating user device would transmit the acoustic gaming session request, for reception or detection by any appropriately programmed devices within acoustic range.

Other user devices with the software of the present invention installed thereon would include or comprise a listening mode which was capable, using the acoustic listening hardware of the user device such as a microphone to monitor the ambient acoustic environment and potentially detect the broadcast of acoustic gaming session requests within acoustic range. Upon detection of an acoustic gaming session request, the one or more receiving user devices could present to their user the option to accept that acoustic gaming session request via the user interface of the user device and if it was decided by the user thereof to accept the acoustic gaming session request and join a gaming session with the initiating user device, the corresponding joining user device or devices would transmit a gaming session join request to the server which identified the joining user device, provided the location of the joining user device as well as potentially any decoded information from the received acoustic gaming session request, along with any contest or advertising availability criteria which it was required or desired to transmit to the server in respect of the user of those user devices again from the perspective of providing the most locationally or otherwise targeted and relevant contest and advertising content as well as to appropriately limit the availability of advertising or contest content as might be required by the application of these availability criteria as well.

It is specifically contemplated that one of the primary types of contest availability criteria or advertising availability criteria which would be applied to the contest packages or advertising packages that are available in the central databases and the server would be geo-fences. Basically each contest package or advertising package could have at least one geo-fence associated therewith which would effectively be in availability criteria defined by location coordinates, so that the particular advertising or contest package would only be made available within particular selected or appropriate geographic areas based upon the GPS or other coordinates of the user devices seeking to join the gaming session. Other types of selection or availability criteria in addition to geo-fences will also be easily understood and are described in further detail elsewhere herein. The creation of a geo-fence criteria in respect of items in the central contest database or advertising database will be understood to those skilled in the art of relational database programming and GIS systems and all such approaches thereto are contemplated within the scope of the present invention.

Following the receipt of a gaming session request as well as at least one gaming session join request by the central server and the gaming engine software thereon, the server and the gaming engine could effectively provision a gaming session between that plurality of user devices. The provisioning of a gaming session would effectively comprise the serving of a contest from a selected contest package in the contest database to those user devices so that the users of those user devices could effectively participate in a short game or contest with each other as defined in the contest package in question—this might be some type of a graphic game, a trivia question game or any number of other type of contests or games which can be presented to the users of user devices which allowed for a brief and fun contest or social gaming encounter between the users of the user devices within a gaming session. The method provides for a social interaction between players in the game or contest using their devices, as well as a means to communicate in person with other people in close proximity to you as a player. Contest or gaming sessions of the present invention could be conducted between people who already knew each other, or it could also be used as a way of meeting new friends interested in similar things.

During or following the completion of the contest, based on the physical location of the user devices, locationally targeted advertising would be served. Coupons, advertising or other product or service discount materials, etc. could be provided to users and their user devices and the possibility of redemption or uptake on those coupons or other advertising materials is maximized by making them locationally relevant to the users, along with even potentially refining them further based on the user profiles of the users and their devices or other advertising selection or availability criteria.

Illustrative Environment and System Architecture:

FIG. 1 shows an illustrative embodiment of a network environment in which the gaming and advertising system and method of the present invention could be implemented or practiced. There is shown in overall networking environment within which contest or gaming sessions including the presentation of locationally relevant advertising material can be facilitated.

The environment includes a system for the facilitation of these gaming sessions. That system includes at least one server 1 which is in communication with a plurality of user devices 6 via one or more data networks 5.

As will be outlined in further detail elsewhere below there are many different types of user devices 6 which could be used, all of which are contemplated within the scope of the present invention.

The various components shown in this particular environment are in communication with each other via one data network 5. As outlined elsewhere herein, the server 1 might actually be connected to a plurality of data networks, each of which network connections provided the conductivity for the server 1 to a plurality of user devices 6. Both such approaches are contemplated within the scope of the present invention. The networks 5 connecting the various devices and components could include the Internet, intranets, extranets, wide area networks, local area networks, wired or wireless networks or other suitable networks or combinations thereof. Connection and communication facilitating the interoperability of the components of the environment in accordance with the overall system and method of the present invention will all be understood to be within the scope hereof.

Different types of communications protocols or methodologies could all be contemplated within the scope of the present invention but it is specifically contemplated that the most likely method of communication for the delivery of contests and locationally relevant advertising media in the context of the method of the present invention would be to deliver it using a client interface which could be accessed through a browser or through pre-existing or easily installed thin client software on the user device, which could communicate bidirectionally with the server 1 and the gaming engine software 2 via the Internet 5.

The server 1 will contain a central gaming engine software module 2 which is responsible for the serving and facilitating out the method of the present invention from the server level. The central gaming engine software 2 will in turn be operatively connected to a contest database 3 and an advertising database 4 each of which comprises a plurality of records related to contests which can be administered within gaming sessions within particular location parameters, and advertising which should be displayed, within particular location parameters to the users of user devices during or following the completion of a contest. The gaming engine software application 2 is intended and executed to facilitate the method of the present invention as will be described herein. The gaming engine application 2 will receive information from user devices 6, including locations of those devices 6 and/or other contest or advertising selection or availability criteria, and based upon the information received from those user devices 6, contests from the contest database 3 can be filtered for selection and play within gaming sessions between a plurality of locationally proximate user devices 6.

The specific hardware and operating system requirements of the server operatively connected in this fashion are understood to those skilled in the art. Server 1 would host or connect to a gaming engine software 2, which is the software which would assist at the server and with the execution of the method of the present invention. The gaming engine software 2 would in turn interface with a contest database 3 and an advertising database 4. The software 2, as well as the contest database 3 and the advertising database 4 could either be resident on a storage medium within or operatively connected to the server 1, or alternatively in a larger server environment the server 1 which provided the external gateway or interface for the system of the present invention could also be networked in such a way that it would connect to another server hosting any one of these components. The specifics of the network design and connectivity could be rendered in many different ways, all of which would be contemplated within the scope of the present invention.

Figure 2:
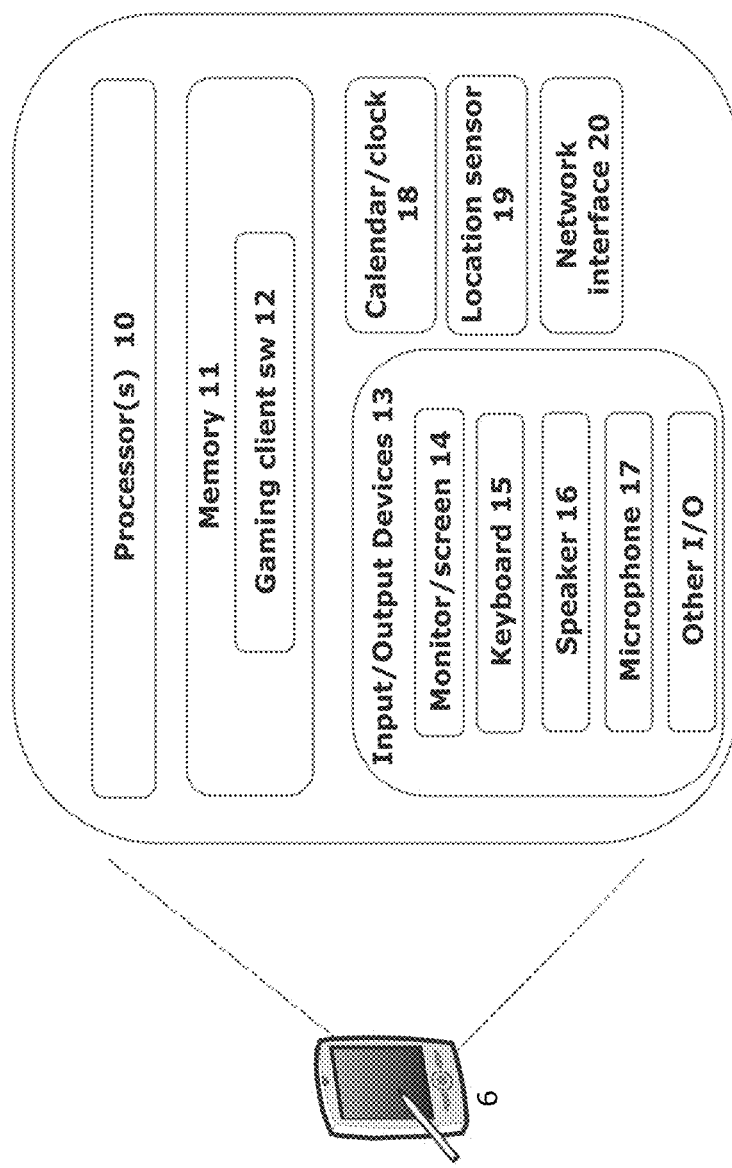
FIG. 2 is a schematic diagram of one illustrative embodiment of a user device in accordance with the present invention.

Illustrative User Devices:

FIG. 2 is a schematic representation of the user device 6 of FIG. 1. The user device 6 includes one or more processors 10 and a memory 11. The memory of the user device 6 might include various types of processor instructions either for assistance in the execution of the method of the present invention or for other activities to be undertaken with respect to her by the user device. The memory 11 would include gaming client software 12 which is installed to facilitate the participation of the user device in the method and gaming and advertising system of the present invention. Using client/server system programming principles it is contemplated that the gaming client software 12 could likely be fairly thin in nature, back loading as much of the processing is possible to the server and the remainder of the system of the present invention.

The user device 6 includes a network interface 20, by which the user device 6 can communicate via a data network with the server 1. The user device 6 also includes a location sensor 19 which could be the necessary hardware and software to for example acquire GPS coordinates for the location of the user device 6 or the like.

The location of the user device 6 is required from time to time in the method of the present invention—most smart phones, tablets or other personal computing devices currently include GPS hardware and it will be understood that any type of a location sensor or combination of hardware and software which will yield a location reading in respect of the user device 6 are contemplated within the scope hereof.

The user device 6 also includes a plurality of input and output devices 13, many of which are required for participation in the gaming and advertising method of the present invention. The first input-output device which will be required for the method of the present invention is a monitor or user display, 14, which will allow for the display of contest information as well as advertising information in accordance with the method to the user of the user device 6. Some user devices 6 will also include a keyboard 15—there might be other devices in which a virtual keyboard was provided by the operating system software of the device on the screen or display 14—certain embodiments of the method of the present invention may not require any keyboard input and as such the keyboard aspect of input-output devices 13 is optional although there does need to be some ability, by touch, keyboard or otherwise, for the user of the user device 62 interact with the device and with the contest or the method of the present invention as it is delivered.

Two other key hardware components in the input-output realm for the user device 6, in light of the intention to use an acoustic triggering method to trigger gaming sessions between user devices 6 in accordance with the remainder of the method of the present invention are acoustic generating hardware and acoustic listening hardware. The acoustic generating hardware is contemplated to be a speaker or the like, shown at 16, which along with other necessary sound hardware and software could allow for the broadcast of acoustic information by the device 6 at an appropriate time—when it was desired to broadcast an acoustic gaming session request by user. As well, the acoustic listening hardware of the user device 6 would be a microphone 17 or the like. The microphone 17 along with other record was set sound hardware and software could be used for the purpose of listening by the gaming client software 12 for the acoustic proximity and broadcast of an acoustic game session request by a user with an acoustically proximate user device 6.

It is explicitly contemplated that the user devices 6 of the present invention would likely be smart phones, tablets or the like with the appropriate gaming client software 12 installed thereon, the majority of these types of commercially available hardware include all the necessary hardware and software components to participate in the method of the present invention if the gaming client software 12 provides the necessary processor instructions for coordination of the behavior all of those other software and hardware components to render the method. It will be understood by those skilled in the art of client/server remote application deployment that any type of a computing device which was capable of interaction with the remainder of the system of the present invention and interaction with the server 1 and the remainder of its associated components via the network 5 are contemplated within the scope hereof.

The most common approach to the provision of the user interface on the user device 6 for interface with a client/server system such as is outlined herein would be to provide an application front end which could be used on the user device 6 to interact with the server and the system of the present invention. Architecturally and conceptually, the concept of "apps" used on smart phones and other personal devices as a front-end to centrally hosted systems is widely known. Where an app interface is provided on the user device 6, the user of the user device 6 would interact the system and server of the present invention by sending and receiving information between the interface app and the server using Internet communication protocol or the like between the user device 6 and the server 1. The specifics of implementing a client server software system using a website or a server at a central bureau and an interface on the user device 6 will be easily understood by those skilled in the art of client/server software design and any method of implementation of a similar approach as contemplated within the scope of the present invention.

Conceptually the use of a local app as the front end or interface to the server of the system of the present invention, programmed using the necessary APIs for the operating system on the user device 6 in question, rather than a browser interface, is a more likely possibility given the need within the scope of the local app or user interface to interact with the hardware system of the user device 6, from the purpose of capturing and communicating the GPS location of the device to the server 1, as well as for the purpose of triggering the gaming session using the near field communication chipset or the like within the architecture and hardware of the user device 6. Development of a browser interface or a local app interface as the user interface between the user device 6 and the server 1 and the remainder of the centrally located method of architecture of the present invention will be understood to those skilled in the art of client/server database and application design and all such approaches are contemplated within the scope of the present invention.

Figure 3:
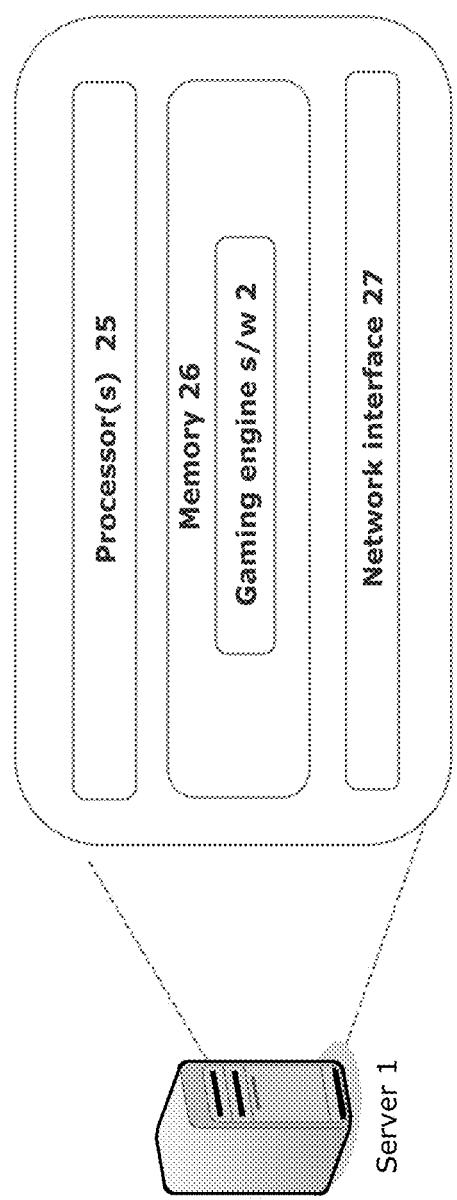
FIG. 3 is a schematic diagram of one illustrative embodiment of a server in accordance with the present invention.

Illustrative Server:

The primary means of delivery of the method of the present invention contemplates a client/server software interface, which would rely on user devices 6 capable of sending and receiving or acting in conjunction with the server 1 via the network or networks 5. FIG. 3 outlines an illustrative embodiment of the server 1 in accordance with the present invention. One or more servers 1 might be implemented in the method of the present invention as a single computing device—a server farm for example or distributed or a cloud computing configuration. The server or servers 1 comprise one or more processors 25 and memory 26. The memory 26 might contain various software components and processor instructions for use in the method of the present invention or otherwise in the operation of the servers 1. The gaming engine software 2 stored within the memory 26 is also shown.

The server 1 is operatively connected to the contest database 3 and the advertising database 4. Connection and interface between the remainder of the gaming engine software 2 and these databases 3, 4 might be facilitated by a component of the gaming engine software 2 or other database interface software components installed thereon.

The combination of hardware and software components within the server or array of servers would accomplish the method of the present invention. The gaming server software application 2, outlined in further detail throughout this document, would be responsible for the execution of the method of the present invention. The gaming engine software application would comprise a plurality of subroutines for the purpose of accessing or administering the databases 3 and 4, receiving gaming session requests and gaming session join requests from user devices, selecting contest packages from the contest database for serving thereof to a gaming session containing a plurality of user devices, serving contests from contest packages to the user devices within a gaming session, and serving at the appropriate time advertising material from selected advertising packages in the advertising database to the users of user devices within a gaming session. The details of the operation of the gaming server software 2 and its subroutines are detailed functionally below. Also shown is a network interface 27—the network interface 27 could again be any wired or wireless interface using a network protocol which allow the server 1 to communicate with the network or networks 5.

Server Software:

The server of the system of the present invention could have many different hardware or software configurations that would accomplish its objectives. The general design of a Web server or a server enabled to communicate with user devices such as those outlined herein via a browser or local application as well known to those skilled in the art of network communications and related software programming and on that basis any type of server architecture which accomplishes this basic objective of bidirectional communication with user devices 6 in the accomplishment of the remainder of the method of the present invention is contemplated within the scope hereof.

Beyond the general operating system and other related software which would be resident on the server for the purpose of its operation, there could also be various database access and administration software or other software components resident on the storage medium of the server or accessible to the processor and memory of the server to allow for the carrying out of the method of the present invention. Server itself may comprise more than one computing device in a larger network environment as well. For example there might be a Web server which was primarily tasked with the communication channel with user devices 6, and a separate database server which might host the gaming engine software components and/or the operative connections to the databases of the method. Again all such approaches that do not depart from the objective of the present invention of providing a client/server gaming engine and contest or gaming method are contemplated within the scope hereof.

Gaming Engine:

The one specific software component which would be resident or operable upon the server 1 as a part of the method of the present invention is the gaming engine software 2. The gaming engine software 2 would be a software resident on or accessible to the server 1 which was capable of receiving data from user devices 6, via the communications network 5 to which those devices 6 and the server 1 were connected, and based upon the receipt of such data from user devices 6, configuring and serving gaming sessions within which multiple users and user devices 6 would participate resulting in the display of locationally or otherwise targeted advertising medium to the users of those user devices 6 during or upon the completion of a selected contest. The functionality of the gaming engine software 2 will be understood by those skilled in the art of database and application programming and design—any gaming engine software 2 which accomplishes the necessary tasks to effectively yield the method of the present invention is contemplated within the scope hereof. The gaming engine software 2 could operatively connect or communicate with other subroutines or software programs on the server 1 or on network connected servers or computers as well, as might be required to deliver the method of the present invention.

In terms of the contests or games themselves, which would be played within gaming sessions in the method of the present invention, the gaming engine 2 would need to be capable of serving to user devices 6 the necessary content or instructions to allow each user of a user device 6 which was connected to the gaming session to participate in that particular contest or game. It is specifically conceived that a number of different types of contests or games could be allowed or provided by the system of the present invention, to enhance the user experience of the overall method, rather than just a single contest or game. In respect of each contest or game which it was desired to be able to deliver to user devices 6 within the method of the present invention, there would need to be a subset of software instructions, queries or the like.

The relevant software subroutines or processor instructions to direct the gaming engine 2 in the administration of a particular contest or game to a plurality of user devices 6 connected to a gaming session would be referred to as a contest package 30. The content and format of each contest package 30 would vary based upon the nature of the contest which it was desired to deliver or administer to the user devices 6 in a gaming session, within which that particular related game or contest was being administered, as well as varying on the basis of the software platform of the gaming engine 2 or the user devices 6. Any set of software instructions, queries, subroutines or the like which would allow for the administration of a contest or a game on the user interface of more than one user device 6 operatively connected in a client/server fashion to a gaming engine software 2 on a Web server is contemplated to be within the scope of the present invention and varying approaches to the development of these contest packages.

In terms of the functionality of the gaming engine software 2, one of the key or initial functions of the gaming engine software 2 would be to receive a gaming session request, via the remainder of the Web server and its operative wide area network connection, from an initiating user device 6 to open a gaming session 15. The session request would identify by some type of user profile or network address the user device 6 requesting the initiation of a gaming session. Coincident with the transmission of a gaming session request to the server software 2, the initiating user device 6 would also transmit an acoustic gaming session request from the device and its location—other listening user devices 6 if they received or detected that acoustic gaming session request could provide to their users a notification or indication allowing the user of those user devices 6 to accept the gaming session request if desired. If the user of a listening user device 6 accepted an acoustic gaming session request that was received, the listening user device would become a joining user device 6 and would transmit a gaming session join request to the server. The gaming session join request would identified by some type of user profile or network address the user device 6 requesting to join a gaming session. To the extent it was received with the acoustic gaming session request, the joining user device could also transmit within its gaming session join request identity or other information of the initiating user device, or other information, as might have been encoded and subsequently be coded within the acoustic gaming session request which was transmitted and received by the acoustic listening hardware of the joining user device 6.

On receipt of a valid gaming session request and at least one responding gaming session join request, the gaming engine software 2 for the purposes of administering a game or contest between the identified user devices 6 would provision in its memory the necessary variables, memory or other hardware or software components required to serve or administer a contest to the user devices 6 within the gaming session created between those user devices 6. It is specifically contemplated that the gaming engine software 2 would be capable of provisioning and/or administering a large number of gaming sessions at the same time. Specific programming and architecture which would be required to render a gaming engine software 2 capable of accomplishing this particular aspect of the present invention would be obvious to those skilled in the art of web or database programming and again all such approaches and obvious attendant modifications to the method of the present invention are contemplated within the scope hereof.

When an active gaming session was created based upon a receipt of a session request from an initiating user device 6 and at least one responding gaming session join request by the gaming engine software 2, part of provisioning the gaming session itself would be for the gaming engine software 2 to select the particular game or contest which would be delivered to the user devices 6 in question. There would be a number of different types of games or contests which could be delivered to user devices 6 within a gaming session in accordance with the remainder of the present invention, and each such game or contest would have a contest package 30, consisting of subroutines, processor instructions or server content or the like stored in an accessible data repository on the Web server 1, accessible to the gaming engine software 2. The selection of the particular contest or game to be served to the user devices 6 within a gaming session could be done at random, or based on a programmed frequency, cycle or routine. A list of available contest packages could also be provided to the users of the user devices 6 within a gaming session and those users by vote or other selection method could selection the contest they wished to play.

It is specifically contemplated that the session request which would be dispatched from an initiating user device 6 to the server 1 requesting the initiation of a gaming session in accordance with the present invention would include, in addition to the network address or other identifying information or contest or advertising selection criteria associated with the user of the device, the location of the initiating user device 6 acquired from the GPS or other location capture hardware thereon. The physical location of the devices 6 would be important from the perspective of assigning an approximate geographic location to a particular gaming session such that in some embodiments of the system of the present invention other users could be shown a list of locationally proximate gaming sessions which were already underway that a third or subsequent user may wish to join if that were possible. The approximate geographic location of a particular gaming session would also be useful from the perspective of selecting the game or contest which would be delivered to the user devices 6 within that session—certain games or contests may only be made available at or near certain locations and by determining an approximate geographic location of the gaming session at the time that it is provisioned or created, based on the physical location of the user devices 6 therein, could be used with the necessary location determination software or components within the gaming engine software 2 or elsewhere on the Web server 1 to for example limit the list of available games or contests, and related contest packages 30, to games or contests, which could or should be made available at particular geographic locations. Games or contests could then be programmed for individual offer or availability based on proximity to an advertiser, proximity to a particular geographic location or attraction, or for any other reason. Individual games or contests may even be limited to geographic locations based upon gaming or other legal regulations, such that a particular type of a contest which was only valid or legal in a particular area was only delivered to gaming sessions configured therein. Configuration of the gaming engine software 2 to allow for the selection and determination of relevant contest or advertising packages based upon the location of the user devices 6 within a gaming session, in comparison to geo-fences or other GIS type criteria saved in association with the contest or advertising packages in the contest and advertising databases will be understood to those skilled in the art of GIS programming and systems and all such modifications and requirements are contemplated within the scope hereof.

Following the determination of an approximate geographic location for a gaming session, the gaming engine software 2 would then, randomly or otherwise, select the game or contest to be served or administered to that particular gaming session. As outlined above, the listening of available games or contests could be geographically limited. The listening of available games or contests from which the gaming engine software 2, or users of user devices 6 within the session, would choose could also be further limited based upon the user profiles of the users of the user devices 6 within the session request, or other contest availability criteria transmitted from the user device or devices 6 along with their gaming session request or gaming session join requests. For example, if user profiles were stored in a user database accessible to the gaming engine software 2, the gaming engine software 2 might know the gaming preferences or other parameters of particular users which could be used to better tailor the selection of appropriate games or contests for the particular users and user devices 6 within a gaming session. Based on some or all of these parameters or limitations, the game or contest which would be administered by the gaming engine software 2 might also be selected by provision of a menu to the user devices 6 within the gaming session, allowing the users to select from a list of available games or contests that they wish to play.

Following the selection of the game or contest which is desired to be played within an active gaming session, the gaming engine software 2 would then load the appropriate contest package 30 from its accessible data repository, such that it could commence or serve the necessary content for the operation of the game or contest to the user devices 6 within the gaming session 15. The maximum interactivity between the users of user devices within a gaming session would be achieved by providing games or contests which allowed for actual player to player or head-to-head play within the gaming session. For example challenges against another for reflexes or responses, playing off against another user in the session on answers to questions and the like. All manner of interactive contests and gaming are contemplated within the scope hereof.

The Web server 1 and the gaming engine software component 2 could provide a function whereby following the pairing of an initial two user devices 6 in a gaming session, additional user devices 6 could be given time, either before the commencement of the game or contest within the gaming session or dependent upon the nature of the gaming sessions even within or during the administration of the game or contest, to by initiating a join request to seek to join a gaming session already in process. Some contest packages 30 could allow for the addition of more user devices 6 than two to a particular gaming session, and other contest packages corresponding to other contests or games to be administered in accordance with the overall method of the present invention may only allow for two user devices 6 within a particular gaming session. Both such approaches will be understood to those skilled in the art and are contemplated within the scope hereof.

Advertising material or media, coupons or other relevant information from an advertising perspective would be served to the user devices 6 within a gaming session, and the advertising material which would be served to each user and user device 6 might be different based upon either the profile of that user or other system parameters. Provision of locationally relevant advertising media to users within or following a gaming session is important to the monetization of the method of the present invention. Again, the establishment of an approximate physical location for a gaming session based upon the location of the user devices 6 connected therein will be important from the perspective of selecting the advertising media to be served. It is specifically contemplated that there would be geographical limitations on the relevance of various advertising media within the method of the present invention and that one of the benefits of the method of the present invention would be the ability to sell to advertisers the fact that their advertisements, coupons or the like were being served to user devices 6 which were actually in close physical proximity to their establishments or to a desired location, for example, rather than serving them to user devices 6 in another geographic territory or area of no relevance to the advertiser. The specific software implementation which would be used to identify most relevant advertising media based on physical location of user devices are based on an approximate physical location of a gaming session, by storage of advertising availability geofence criteria with respect to particular items of advertising media.

A final limitation on the listening of games or contests, which might be provided or selected from in the provisioning of a gaming session would be to limit the list of games or contests, which were made available, either for automatic or manual choosing of the game to be played by only providing games or contests to choose from which could be provided or administered along with the most locationally relevant advertising media within the system. Effectively, advertising could be prioritized over contest details, so that only contest packages which were compatible or desirable to be used with available advertising packages based on advertising availabity criteria including geofences for same, would be selected from. Certain games or contests might only be useful as a delivery system for a particular set of advertising media and as such if there were only some of the games or contests related to particular advertising media which should be served to user devices 6 within a particular geographic location, the games or contests, which did not have appropriate advertising media associated there with could be ignored in the creation of this selection list. In other embodiments of the invention, or even in certain games or contests, there may be fewer limitations on the specific advertising media which could be served or presented to users and those games or contests, which had a more global inventory of advertising media available could always be presented or could be presented higher or lower in a ranked list as might be desired.

The gaming engine 2 would need to select and then administer to each user device 6 the relevant processor instructions, browser content or the like to allow the user of that user device 6 to play the selected contest or game, as well as then needing to select and serve to the user device 6 the relevant or permissible advertising material at the appropriate time, either within or following the completion of a particular contest or gaming session.

Contest Database:

There are two key data structures which are anticipated to be required to be operatively connected to the server 1 for the purpose of executing the method of the present invention in conjunction with the gaming engine software 2. These are a contest database 3 and an advertising database 4.

As outlined herein, each contest or game which was desired to be provided for users of the system of the present invention would have a set of programming instructions, graphic or other media etc. which might be required by the software components of the gaming engine software 2 to interact with users at their user devices 6 and to facilitate the service of a game or contest related thereto to a plurality of users at their devices. Each contest or game, whether that be a videogame for playing by users at their user devices 6, a trivia game, or a contest of any kind, would have a necessary related set of programming instructions which comprise a contest package 30. The contest package in addition to server-side instructions or other media and material for the administration of the related contest to one or more user devices would also include any contest availability criteria, including geo-fences or other availability criteria which were to be applied in the selection of the contest package in question as an available option for a particular gaming session with a particular location assigned thereto.

The contest packages 30 in an optimized software design would contain the necessary information for the execution of the associated contest within the user interface and environment of the method of the present invention, for all of the different types of user devices 6 in respect of which the method the present invention could be practiced. For example, the contest package 30 associated with respect to a particular contest which could be selected by users or by the method and system for execution within a particular gaming session, would need to contain all of the necessary information for the system to render that particular contest to the display of each type of user device 6 which it was contemplated or desire to accommodate within the scope of the method of the present invention. Different types of smart phones running different operating systems would potentially require different code or different code parameters which could be passed to the interface and the remainder of the user device 6 hardware in the rendering of a particular contest and all this information would need to be stored within the contest database 3 in relation to the contest package 30 in question for use by the local device interface at the time that the contest was selected or operated. Physically, the contest packages 30 could take many different formats and might also simply comprise instructions stored within the tables in a database for this purpose. The concept of these subroutines or modules of program instructions or parameters would be understood to those skilled in the art of computer programming and any such approaches contemplated within the scope hereof.

The contest database 3 would be any data structure within which the necessary contest packages 30 could be stored for each different type of game or contest which it was desired to deliver in accordance with the present invention. In addition to the contest packages 30, the contest database 3 would also potentially include other necessary parameters or indexes to assist the gaming engine software 2 in the proper selection and administration of games and contests. The contest database 3 might be a folder structure or more formal database capable of storing all the necessary information with respect to the individual contest packages 30. Many different types of data structures would be obvious to those skilled in the art of database design and all are contemplated herein.

Figure 4:
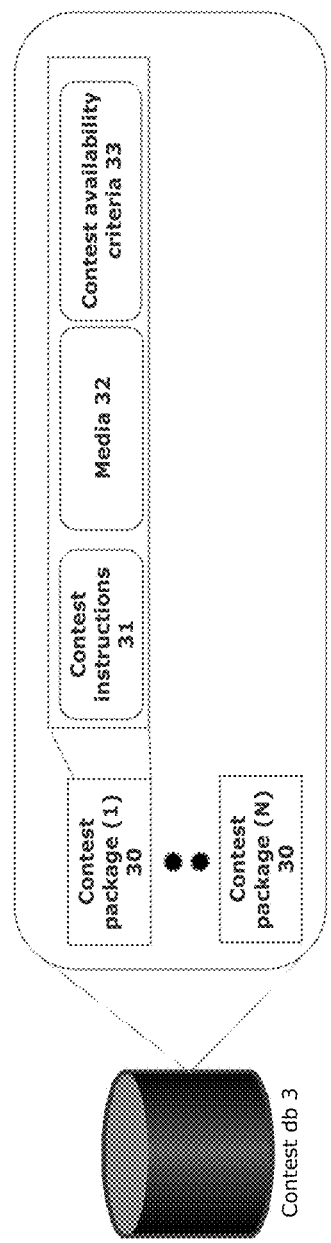
FIG. 4 is a schematic diagram of one data structure of an illustrative embodiment of the contest database in accordance with the present invention.

FIG. 4 shows one business level schematic of a data structure of a contest database 3 in accordance with the present invention. The database structure could take many different formats but a traditional relational database will make sense to those skilled in the art of database programming subject to the need to accommodate the storage of different types of media and instructions therein. Shown in FIG. 4 is the repository of a plurality of contest packages 30. With respect to each contest package 30 there is shown a number of different categories of information which would be stored in association therewith. The first information which would need to be stored with respect to each contest package 30 would be the necessary contest processor instructions 31, which would be processor instructions or other software components or routines required by the server 1 and the central gaming engine software 2, or to be served to the browsers or other clients on user devices 6, in the administration of the contest programmed with respect to that particular package 30. As outlined elsewhere herein, it may be necessary to store different processor instructions or collateral material and program subroutines based upon the number of different type of hardware or software and operating systems which it is desired to accommodate in user devices on the method of the present invention.

Also shown in addition to the processor instructions 31 which would need to be stored with respect to each contest package 30 are media 32. This is simply contemplated to represent any images, sounds, or other collateral materials which might be required by the program subroutines to administer the contest package 30 and its related contest to a plurality of user devices within a gaming session. It will be understood that really any type of data can be stored as media 32 within the database subject to the necessary modifications to the data structure thereof and all such types of media or other material stored for use in this fashion are contemplated within the scope of the present invention.

Finally, shown with respect to the demonstrative contest package 30 in FIG. 4 are contest availability criteria 33. Contest availability criteria 33 as outlined elsewhere herein might comprise GIS type geo-fence limitations or coordinates, for the purpose of making a particular contest package only available within a particular geographic area, or excluding that package from a particular geographic area. Additional types of contest availability criteria 33 might be related to users or user devices—for example some contest packages might only work on particular user device platforms, there might be other criteria of the users themselves including age or the like which can also be applied in a filtering maneuver to only make appropriate contest packages 30 available for selection by the gaming engine 2 or users of user devices 6 within gaming sessions. Again the specific types of contest availability criteria 33 which can be contemplated are fairly wide-ranging. The contest availability criteria 33 might also be placed into a separate data structure apart from the remainder of the contest packages 30 and appropriately linked as will be understood to those skilled in the art of relational database design and any such modifications will not be intended to depart from the scope here of.

Advertising Database:

The second key data structure of the system of the present invention, which would need to be accessible to the gaming engine 2 of the system of the present invention is an advertising database 4. The advertising database 4 would contain details or copies of all of the various advertising media which it was desired to at the appropriate times select and display to users of the system and method of the present invention. In addition to storing the actual advertising media themselves within the advertising database 4 it would also be necessary to store advertising availability criteria based upon which it was decided to potentially select for display the media contained within the database 4. For example in so far as the primary selection criteria for the display of advertising media to a winner or a player within the gaming session in accordance with the method of the present invention is the location of the user, based upon the location feedback received from their user device 6, location-based advertising availability criteria might be stored and used.

Figure 5:
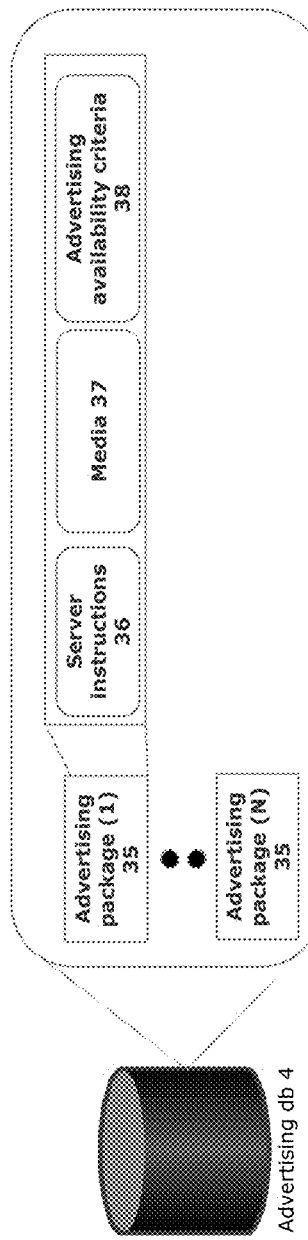
FIG. 5 is a schematic diagram of one data structure of an illustrative embodiment of the advertising database in accordance with the present invention.

Referring now to FIG. 5 there is shown a high level business schematic of a demonstrative data structure of the advertising database 4 of the present invention. The advertising database 4 would contain a plurality of records or data pertaining to individual advertising packages 35. Each advertising package would represent a particular coupon or other advertising media which it was desired to display either to a winner or to one or more users via their user devices during or following the completion of a gaming session.

As can be seen in the Figure, the advertising package 35 is intended to comprise from the storage perspective the necessary server instructions 36 to allow for the display of the advertising medium in question at the appropriate time. This would again comprise necessary server or client software instructions or other subroutines or materials required to allow the gaming engine or the gaming client to display the desired advertising material at the appropriate time. In addition to the server instructions 36, advertising media 37 are shown. The advertising media would comprise any type of static collateral material which again might be required for the purpose of display—images, sounds and the like—again as outlined with respect to the contest media 32 really any type of media 37 is contemplated and there may just be the requirement to make some structural modifications to the advertising database 4 of the table structure therein to accommodate different types of media from time to time.

Finally there shown advertising availability criteria 38. These advertising availability criteria 38 would be stored with respect to each advertising package 35 and as it with respect to the contest packages 30 might include geographic or GIS type geo-fence advertising availability criteria 38, or other device specific or user specific availability criteria could again also be included or prescribed, which could in combination be used to delimit the availability of particular advertising packages for display to users a particular user devices 6 during or following the completion of a gaming session.

Similar to the contest availability geo-fence criteria outlined above, advertising availability criteria might also include geo-fences which would be capable of selecting or deselecting particular advertising packages 35 from availability to the user device or devices within a particular gaming session. A location index specifying locational parameters within which a particular advertising item would be relevant or selected for display to user would be required. Similarly, if there were other either compliance requirements or optional selection criteria which it was desired to incorporate into the selection algorithm used to select the particular advertising media to be displayed to a particular winner or player within the gaming session—for example if in the context of a particular contest it was decided that it was required to enforce an age limit on the display of particular material the necessary additional selection indexes could be included within the data structure of the advertising database 4 to allow for these added layers of granularity in the selection of advertising medium for display.

The specific data structure of the advertising database 4 could be developed or optimized for integration with the remainder of the system of the present invention such that the gaming engine software 2 could access, read and write to and from that database 4 as required. The specific language, architecture or parameters used to create the advertising database 4 could vary depending upon the development environment used for creation of the remainder of the software components of the present system and any such structural approaches contemplated within the scope of the present invention that allows for the execution of the method outlined herein.

It is also contemplated that the data structure of the present invention could include either additional tables within the advertising database 4, or additional data structures elsewhere therein, that could capture or retain the details of gaming sessions and user interactions with the system of the present invention such that the user profiles developed from use of the system of the present invention could be used either for further targeting of advertising media or contest availability in the future, or even for other third-party purposes within the realm and scope of appropriate data capture collection techniques.

Dependent upon the final design of the system of the present invention the contest database 3 and the advertising database 4 could be housed within a single same data structure. It is specifically contemplated that either freestanding databases 3 and 4, or the combination of those in a single combined data record structure would both be possible and understood and both such approaches are again contemplated within the scope of the present invention.

Figure 6:
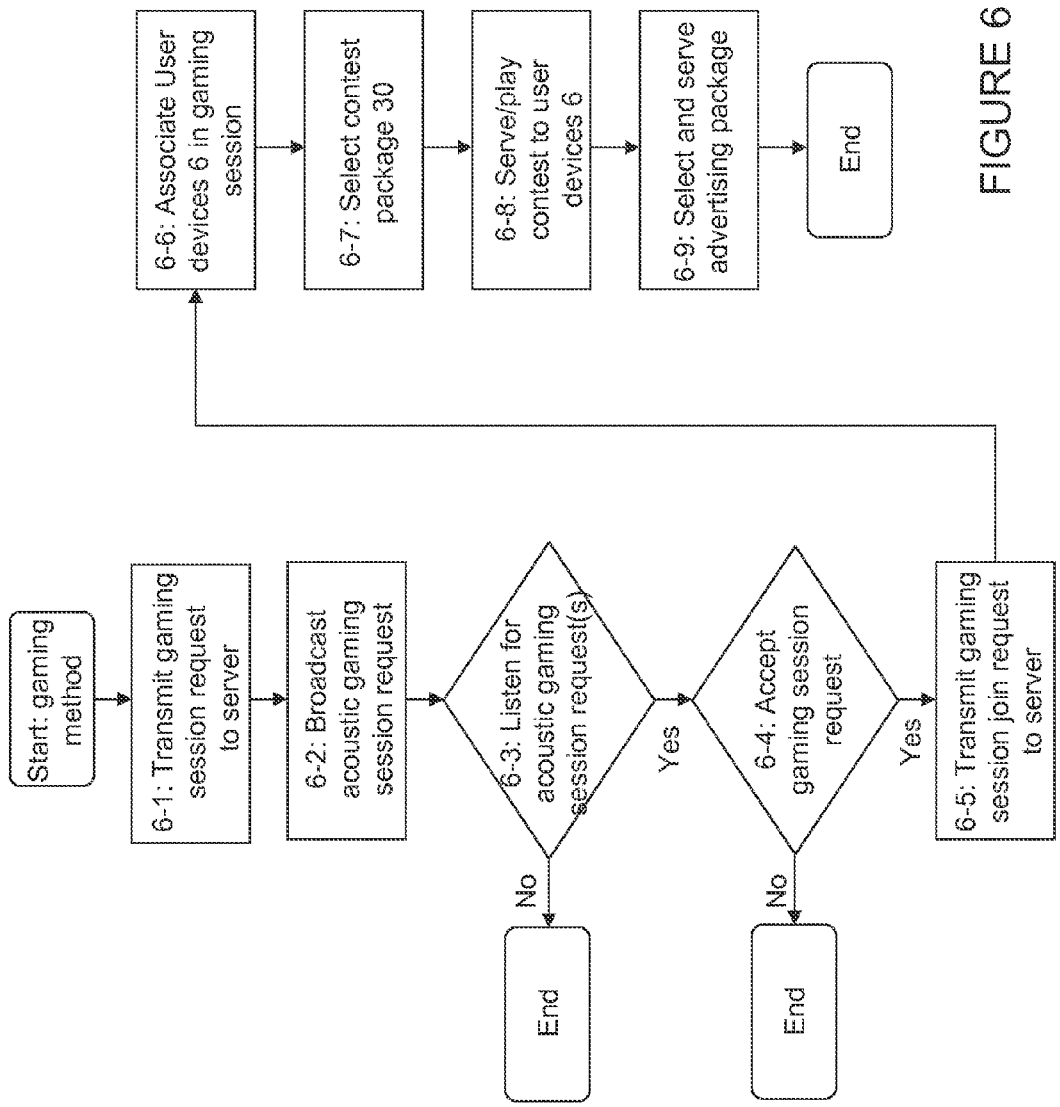
FIG. 6 is a flow chart demonstrating one overall flow of an embodiment of the gaming and advertising method of the present invention.

Details of the Method:

Having now describe the components of the server, client, software and system of the present invention in some detail it is desired to explain the method of the present invention in further detail for the purpose of fully enabling same. FIG. 6 is a flow diagram demonstrating the steps of one embodiment of the gaming and advertisement method of the present invention, from a high-level perspective of the conduct of the method by all of its necessary physical components.

As outlined elsewhere herein the overall infrastructure architecture of the system of the present invention comprises a server with gaming engine software there on, and a plurality of user devices each of which contain a gaming client capable of interaction with the gaming engine and the server. Referring to the method of FIG. 6, the first step in the method shown at 6-1 is the transmission of a gaming session request to the server. A gaming session request would be transmitted to the server 1 and the gaming engine 2 there on by the user and his user device 6 at such time as they wished to query their proximity and/or commence a gaming session with other users of equipped user devices in the area. Initiation of the gaming session request would be done by the user of the user device 6, through the user interface of the gaming client software 12. It is contemplated that the user of this initiating user device 6 would simply select an option within the user interface of the gaming client 12 to seek to commence a gaming session which would result in the necessary request being initiated. The transmission of the gaming session request to the server 1 from the user device 6 would include the location of the user device 6, along with any other contest availability criteria or advertising availability criteria pertaining to the user of the user device 6 which were stored on the local client 12. Other information can also be included in that transmission or packet although this is the basic type of data which it is anticipated would be required to trigger the remainder of the method of the present invention.

In addition to the transmission of a gaming session request to the server 1 and the gaming engine software 2 there on, the second part of the dual part initiation of the gaming session in accordance with the remainder of the present invention is the initiation of a physical interaction between the initiating user device, being the user device of the user seeking to trigger a gaming session, and other user devices in the area. The physical interaction between those devices is specifically contemplated to be an acoustic interaction by bringing them into close proximity with each other. Shown at step 6-2 is the broadcast of an acoustic gaming session request by the initiating user device 6. The acoustic gaming session request would be a sound or tone or series thereof which would be played using the acoustic generating hardware of the user device 6, such as a speaker or the like, for potential detection or pickup by the microphone or acoustic listening hardware on other user devices 6 in acoustic proximity. As outlined elsewhere herein, the acoustic gaming session request could be a predetermined and static tone which could be recognized or captured by the client software 12 on other user devices 6 in the acoustic proximity of the initiating user device 6, or rather than a static tone or sound, the acoustic gaming session request could also, as outlined in some prior art or other activities, encode information into the acoustic gaming session request. Some companies and other inventors have made headway in developing systems by which a small number of bits of information can be encoded into an acoustic transmission, and subsequently decoded by another client software on another device and this is contemplated within the scope hereof.

The next step, taking place in parallel on other user devices in proximity, is the listening for acoustic gaming session requests in the area. This is shown at 6-3. Basically the gaming client software 12 on user devices equipped with the gaming client software could be set in a listening mode where the acoustic listening hardware being the microphone and related hardware and software components therefore were scanning and the other environmental noise to identify the acoustic signature of acoustic gaming session requests, and if an acoustic gaming session request was detected the next step in the method could be triggered. From the perspective of a listening user device if no acoustic gaming session requests were identified within the acoustic proximity of the device, no gaming sessions in accordance with the remainder of the method of the present invention will be triggered.

If the client software 12 listening user device 6 detected an acoustic gaming session request within its acoustic proximity, the client software 12 on that listening user device 6 could present to the user of that user device 6 and interface by which they could accept participation in the gaming session or accept the gaming session request—this is shown at step 6-4 in this method. If the user declined to participate in the requested gaming session, their device word go back into listening mode or otherwise ignore further participation in the gaming session. Alternatively if the user elected to accept the gaming session request, again shown at decision block 6-4 in this Figure, the gaming session could be configured and executed. If a user of a listening user device accepted a gaming session request, as shown at 6-4, that listening user device would be, joining user device 6. The joining user device for transmitting gaming session join request to the server 1, shown at step 6-5. The server 1 and the gaming engine 2 there on what aggregate the identity of the initiating user device 6 and any joining user devices identified by gaming session join requests received, to identify a completed number of user devices 6 to associate in a particular gaming session. Once a predetermined timeframe had elapsed or it was otherwise determined that the window for acceptance of the gaming session request transmitted by the initiating user device 6 had expired, the user devices identified would be associated in a gaming session, shown at step 6-6 in this process.

Both the gaming session request as well as the gaming session join requests transmitted from the various user devices participating in the gaming session would have included any contest availability criteria or advertising availability criteria pertaining to the users or those user devices, as well as the locations of each of those devices. Based upon the application of the locations of the devices in the gaming session as well as any other availability criteria, a contest package 30 would be selected from the contest database 3. The contest package 30 can be selected by the gaming engine 2, or in some embodiments could be selected by presentation of a menu of available contest packages 30 back to the users of the user devices within the session. Selection of the contest package to be executed is shown at step 6-7. A desired advertising package 35 from the advertising database 4 will also be selected for each user and user device combination within the session so that an appropriate advertisement could be served and/or displayed to the user of the user devices 6 within the gaming session at the appropriate time, either during or following the play of the contest. Different advertising packages 35 could be selected for each user and device combination within a gaming session—it would not be necessary that the same advertisement be shown to each user and user device therein, although that approach could also be taken. It is specifically contemplated that different advertisement availability criteria might apply to different users of user devices and as such it may be desirable to have the ability to tailor the advertisement to be shown on a user by user basis.

Following the selection of the contest package 30, step 6-8 shows the serving or playing of the contest which is the subject of that contest package 30 from the server 1 to the user devices 6. Either during the playing of the contest, or following the playing of the contest, the advertising medium of the selected advertising package 35 would be displayed to the user of the user device which is shown at step 6-9. Following the completion of the contest and/or the display of advertising to the users of the user devices within a gaming session, the gaming session would be completed and the method would be completed. Presumably users of user devices 6 at that point could seek to trigger another gaming session or could otherwise carry on with their affairs.

Figure 7:
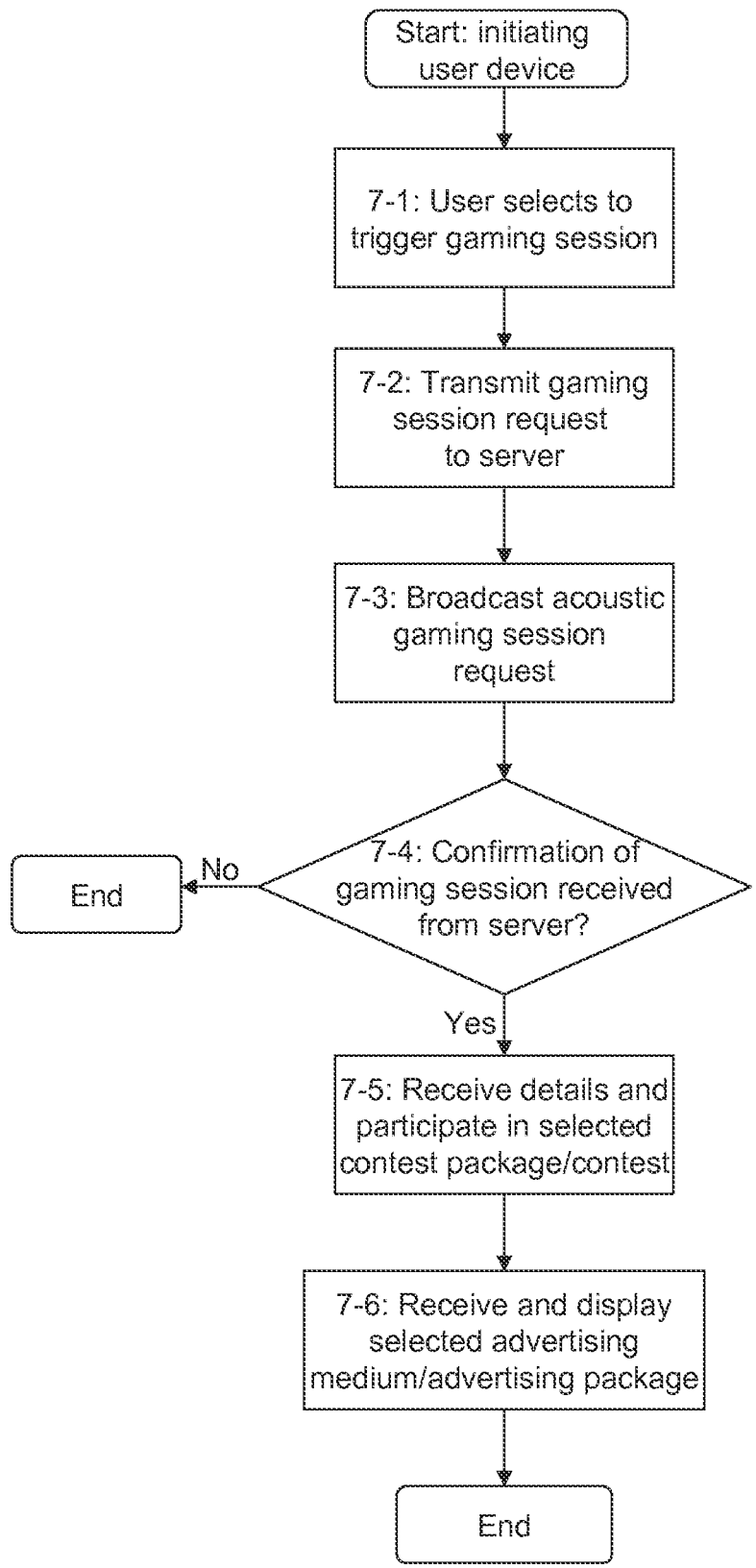
FIG. 7 is a flow chart demonstrating one overall flow of the steps of the method of the present invention as conducted by the gaming client on the initiating user device in gaming session in accordance with the method herein.

The method of the present invention can further be understood by breaking apart the overall method shown in FIG. 6 into three sub figures isolating the steps of the method which would be conducted by each of the initiating user device, joining user devices and the server within the method and system. Referring first to FIG. 7 there is shown a flowchart of the steps conducted by the initiating user device and its associated gaming client software 12 within the conduct of a gaming session in accordance with the advertising and gaming method of the present invention. As shown in that Figure, the user of the initiating user device 6 would select to trigger a gaming session, using the user interface of the initiating user device 6, shown at step 7-1. Upon selection to trigger a gaming session, the gaming client software 12 with first as shown at 7-2 transmitting gaming session request to the server 1 and the gaming engine 2 there on which again is outlined above would provide the necessary identification or details of the initiating user device 6 and its location, along with any other contest or advertising availability criteria desired to be transmitted for the formatting of selections of appropriate advertising or contest materials. Shown at step 7-3 is the formulation and broadcast of an acoustic gaming session request within the acoustic proximity of the initiating user device 6. Again is outlined herein, the acoustic gaming session request would be a sound or series of sounds which could be detected or received by gaming client software 12 on a listening user device 6, which may or may not be encoded with additional information. If for example the identity of the initiating user device 6 was encoded within the acoustic gaming session request, that can be decoded when received and transmitted to the server by the listening user device for the purpose of more accurately or quickly determining the appropriate gaming session to be joined by that listening device.

Following the transmission of a acoustic gaming session request, the gaming client software 12 on the initiating user device 6 could effectively listen on its network interface to the server for receipt of confirmation of any gaming session initiation, based upon anyone within acoustic proximity of the initiating user device 6 having accepted the gaming session request. It might also be the case that a listening user device which was transmitting a gaming session join request to the server might actually also transmit back and acoustic confirmation of some type which could be received, parsed and read by the gaming client software 12 on the initiating user device 6 although is specifically contemplated that the most efficient means of commencement of a gaming session would be to have the initiating user device 6 simply monitor or await confirmation of a transmission from the server 1 with the details of a gaming session initiated or of a particular contest being served to the initiating user device based upon acceptance of the acoustic gaming session request by at least one listening user device within acoustic proximity. It is specifically contemplated that the number of user devices who can participate in a particular gaming session would be limited only by the type of contest packages which were available.

If no confirmation of the commencement of a gaming session is received from the server, at step 7-4, effectively comprising an indication that there is no one in the vicinity interested in playing in a contest in accordance with the remainder of the present invention, nothing further would happen in the method would end. Alternatively however if confirmation of the commencement of the gaming session was received from the server, the next step in the method shown at 7-5 would be to receipt of details of the contest to be played from the server by the client software 12 and displayed to the user of the initiating user device 6, as a part of participation in the selected contest or contest package. As well, the initiating user device would receive at the appropriate time from the server as the gaming engine 2 the selected advertising corresponding to the selected advertising package determined for that particular combination of user and user device with respect to the contest package in question, such that the advertising media associated therewith can be shown to the user of the initiating user device 6 at the appropriate time either during or following the completion of the contest in the contest package in question. The advertising package which is selected in conjunction with a particular contest package and a particular cycle of the gaming session methodology of the present invention could either display a coupon or advertisement only to the winner of the contest of the contest package selected, or could alternatively display advertising to all participants. It is most likely conceivable that while the winner of the contest might receive a coupon or something of that nature for winning the contest played with others in the gaming session, it would most likely be desirable to display advertising to all participants in gaming sessions in accordance with the remainder of the method of the present invention. All such approaches are contemplated within the scope hereof.

Figure 8:
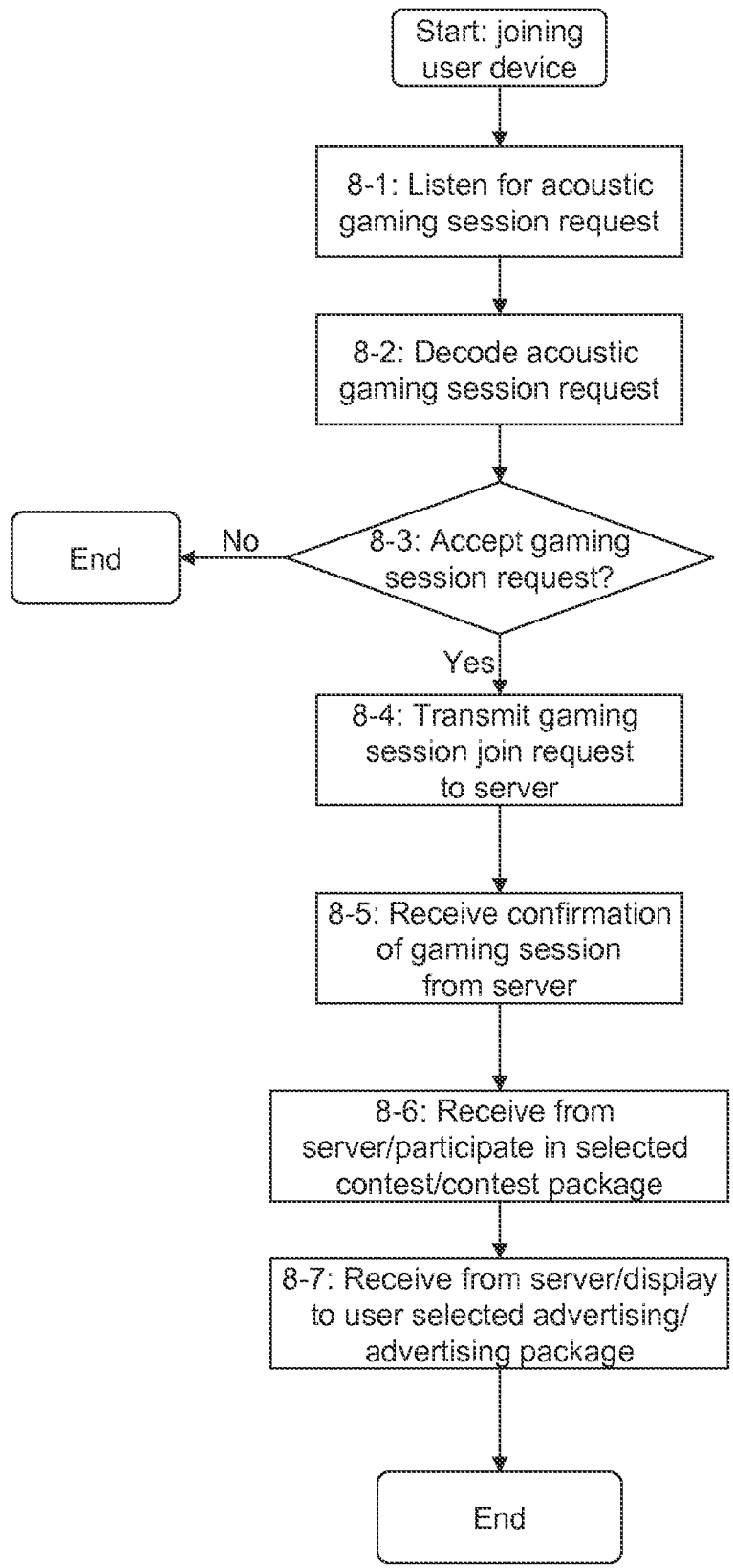
FIG. 8 is a flow chart demonstrating one overall flow of the steps of the method of the present invention as conducted by the gaming client on a joining user device in gaming session in accordance with the method herein.

Flipping over to a look at the gaming method of the present invention from the perspective of a joining user device, being a user device 6 of a user who sought to enjoin a gaming session being commenced by another party, we refer to FIG. 8. The user of the joining user device, which would at the first portion of the method be a listening user device, would place the client software 12 thereon into listening mode such that the listening user device 6 could listen for any acoustic gaming session requests in the acoustic proximity of that device. This is shown at step 8-1.

If the gaming client software 12 in conjunction with the acoustic listening hardware and software of the user device in question detected and acoustic gaming session request in proximity, that acoustic gaming session request could be decoded, shown at step 8-2, and a user interface or prompt shown to the user of that device seeking their input as to whether or not they wish to accept the gaming session request. This is shown at step 8-3. If the acoustic gaming session request is accepted, the method would continue and if the acoustic gaming session request was declined, the method would end.

The next step in the process if the gaming session request is accepted is the transmission of a gaming session join request, by the client software 12 on the listening user device to the server 1. At this point the listening user device 6 becomes the joining user device in the terminology perspective, joining the gaming session along with the initiating user device. As is the case with the transmission of the gaming session request to the server by the initiating user device, the game session join request transmitted to the server by the joining user device would include the necessary information to identify the joining user device and its location, as well as potentially other contest or advertising availability criteria and/or other information decoded from the acoustic gaming session request as well. This is shown at step 8-4.

Next, shown at 8-5, the joining user device would receive confirmation from the server of the commencement of the gaming session along with the other user devices within that session, and as shown at 8-6 the joining user device or devices would each receive from the server any necessary push and pull or data from the server and the gaming engine 2 such that they could participate in the selected contest for contest package 30. Finally, shown at 8-7, the joining user device would receive from the server for display to the user at the appropriate time either during or following the completion of the contest the selected advertising or advertising package materials.

It is specifically contemplated that a single gaming client software 12 could be created for use on the user devices both as initiating user devices for the transmission of gaming session requests and acoustic evening session request and participation in gaming sessions in accordance with the method herein, as well as the detection and receipt of acoustic gaming session requests and subsequent joinder and participation in gaming sessions as well. Any gaming client software which will accomplish the overall method of the present invention is contemplated within the scope of the claims hereof.

Figure 9:
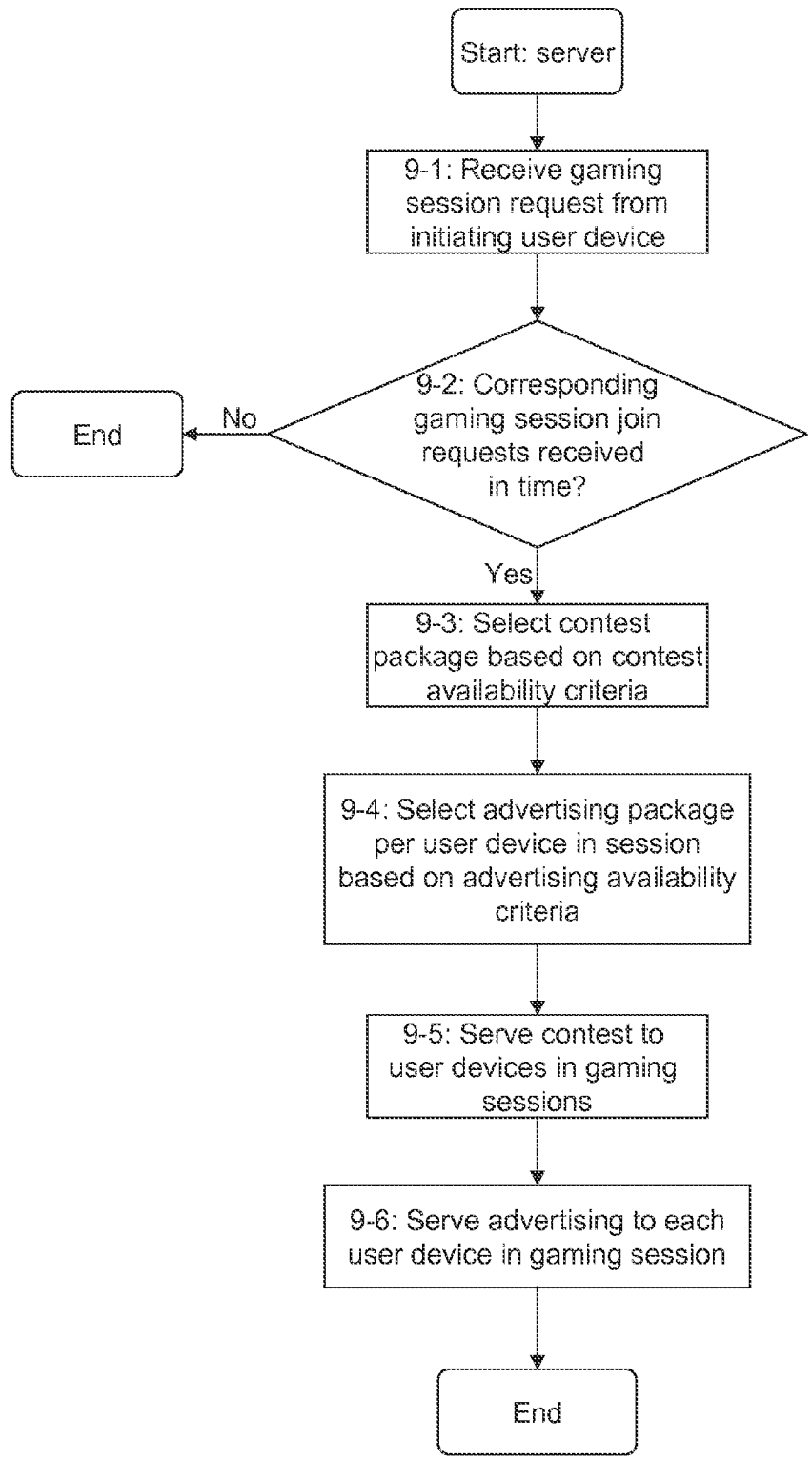
FIG. 9 is a flow chart demonstrating one overall flow of the steps of the method of the present invention as conducted by the gaming engine software on the server.

Referring next to FIG. 9 there is shown a flowchart of the steps of the method of the present invention from the perspective of the server and the gaming engine software 2 installed thereon. The gaming engine software 2 and the server would first perform a listening function, whereby the server would listen on its network interface or interfaces for any gaming session requests incoming for many initiating user devices. If a gaming session request was transmitted to the server from an initiating user device it would be received at step 9-1.

Upon receipt of a gaming session request from initiating user device 6, the server and the gaming engine software 2 thereon would wait to receive any gaming session join requests corresponding to that gaming session request—that is to say that if at the client end a joining user device dispatched a gaming session join request to the server based on their own receipt and acceptance of the acoustic gaming session request associated therewith, the gaming session join requests would be matched up the gaming session request to assemble the inventory of user devices 6 to whom a particular selected contest package would be served in accordance with the remainder of the method of the present invention. It is assumed that the primary means of determining whether or not a gaming session would be constituted in a contest administered would be to provide a particular predetermined timeframe within which listening user devices could become joining user devices following the receipt of a gaming session request from an initiating user device, although there might be other means of determining or cutting off the window within which listening user devices could also join into a gaming session and all such approaches are contemplated herein. There may also be certain embodiments of the invention which would even allow for the subsequent joinder of a user device into an existing or ongoing contest or iteration of the method and that is also contemplated herein.

Upon receipt of at least one gaming session join request and response to a gaming session request, shortstop 9-2, the gaming engine 2 would select a contest package 30 from the contest database 3 based on the contest availability criteria contained within the various gaming session requests. Also shown, at step 9-4, the gaming engine 2 would select an advertising package related to each user and device combination in the session based on the advertising availability criteria. As outlined elsewhere herein it might be the case that the advertising material to be provided or displayed to the users might only consist of a coupon or advertisement for example to be shown to the winner of a particular contest, or it may also be the case that the winner would be provided some type of a prize and other participants in a gaming session would still receive an ad or a coupon or the like. Many different flexible approaches to the content as well as the applicability of the advertising content of the advertising packages 35 stored within the advertising database 4 can be contemplated.

Following the selection of the appropriate contest and advertising packages for the administration of the gaming session, step 9-5 shows the serving of the contest content to the user devices in the gaming session. This would be the initiating user device and any joining user devices having sent a gaming session join request. The contest would typically be administered in a client/server fashion—again the general idea here has much flexibility in terms of different embodiments of its implementation without departing from the overall concept of serving to the user devices within a gaming session a particular contest selected based on contest availability criteria which might include geo-fences or the like.

Finally, shown at step 9-6, advertising from the selected advertising package for each user device would be displayed either during the contest or following the contest, within the gaming session. Following the completion of the gaming session the method would be completed.

Users of the system or method of the present invention might have client software installed on their user device 6 which would monitor the location of the user device 6 and could provide a listening of other close-by users to the owner of a user device 6, so that an additional social interaction element of meeting new people could be added to the gaming method—identifying information of other users who were within a particular distance could be shown to the user of a user device 6 and they could seek out one or more of those people to initiate a gaming session.

Following the triggering of a gaming session between at least two user devices 2, the server 1 and gaming engine software 2 might wait for a period of time or provide a user interface mechanism by which either at the beginning or during the gaming session additional user devices 6 could join the gaming session, and a gaming session with a large number of participants could thus be accommodated. The number of simultaneous connections of user devices 6 to a gaming session could really be unlimited, subject only the necessary hardware and software capabilities at the server end and the gaming engine software 2 being capable of administering and serving a gaming session to the maximum number of connected user devices 6. Part of the social interaction aspect of the present method is that when user devices 6 of users are joined to a gaming session in accordance with the present invention, user information or details could be exchanged and stored between the devices 6 or the user profiles of the related users on the system of the present invention so that for example the system and the client software on the user devices 6 might subsequently notify a user when their "friend" or previous players are physically located nearby.

The list of available games or contests could be tailored based upon the location of the user devices, such that either from a permissibility or marketing perspective only particular contests or games were made available to the users based upon some type of program the availability parameters on the system, or the list of available games or contests could also be limited based upon legal requirements related to the users and their locations. For example, if a particular type of a game or contest qualified as a lottery or the like which was subject of some type of age or location limitations from a regulatory perspective, the regulatory framework could be programmed into the system and applied in the rendering of the list of available games or contests, such that only permissible games or contests from a legal perspective were made available. Finally another layer of availability tailoring could take place. Insofar as if there were only certain types of locationally relevant advertising media available for service to the users and user devices 6, and some of those advertising media were only contextually relevant or available in respect of certain games or contests in the inventory, then the list of available games or contests could be tailored based upon the available advertising media as well. All of these types of filters or parameters will be understood to those skilled in the art of database programming, and allowing for filtering or selection on this basis based upon user parameters or other parameters stored within the system of the present invention, are all contemplated within the scope hereof.

User Profile Parameters:

The server and its related software components may store a user profile with respect to users of the system. Alternatively, a user profile with respect to the user, containing parameters related to that user, might also be stored on the local user device 6 and transmitted, as appropriate to the server 1 along with the remainder of the gaming session request. Storage of various user related parameters could allow for better targeting both of the available games or contests, as well as the proper or available advertising media to be provided to the users during or following gaming sessions. If a user profile was stored or developed, the user profile parameters could also be used within the context of actually serving or handling in administering the actual gaming session—for example particular parameters with respect to the user themselves could be used either by the local interface or application at the user device, or by the server and the gaming engine software 2 to logically adjust the delivery of particular material or particular gates or routes through the logic of the gaming subroutine. Gathering of a user profile with respect to a user of a user device, and either saving it locally on the user device or centrally in a database on the server or accessible to the server 1, will be understood to those skilled in the art of user specific computer programming and security and authentication and all such approaches are contemplated within the scope of the present invention.

For example, a user profile might include the age of the user so that only age-appropriate games or contests could be displayed or age-appropriate advertising content could be provided. Also user profile might include the actual residence location of a user, so that the actual residence location of the user could be used in addition to the particular specific and instant physical location of the user device, either in the selection again of appropriate games or contests, or appropriate advertising content. Many different types of user attributes or parameters could be captured and stored with respect to a user of the system of the present invention.

Gaming Sessions:

As outlined above, it is specifically contemplated that the server 1, the gaming engine 2 and related architecture and components would be capable of administering multiple gaming sessions at the same time to multiple groups of user devices. This type of a multithreaded server programming approach will again be understood to those skilled in the art and any type of a software implantation in respect of the gaming engine 2 that results in the ability to host or serve multiple gaming sessions in accordance with the present invention, each to a plurality of user devices, is all contemplated within the scope of the present invention.

Qualification or Selection of Advertising Content Per User Device:

The advertising content displayed to a particular user device could be selected based on user specific attributes stored in a user profile, as outlined herein, in addition to other index parameters. For example, upon completion of a particular gaming session or within a gaming session at a point where it was desired to serve advertising content to a user, the content selected from the advertising database could be selected based on user level attributes. For example, only age appropriate content could be selected and thus even though players of many ages could play in a particular gaming session, the advertising content selected for display could be limited to that deemed appropriate by the filter based on the attributes in question. Similarly if it was desired to include advertising material that was locationally relevant to the home address of the user rather than just the current physical location of the user device 6, the home address of the user could be used as an alternate or additional locational parameter alongside or in place of the current physical location of the user device 6 to yield a relevant selection from the advertising database (for example a restaurant coupon in the home neighbourhood of the user could be provided based on using the home address of the user as a filter criteria). Addition of this type of a level of user attribute level filtering, either to advertising content selection or the selection of available games or contests for users in a gaming session, will all be understood to those skilled in the art of database design.

Enforcing Gaming Compliance and Contest Availability:

One of the aspects of the method of the present invention is that based upon the storage of user attributes and the capture of the physical location of user devices, a level of gaming compliance and availability can be enforced. For example, if particular games or contests within the method can only be played by people of the age of majority, based on the age of majority stored in the user profile they could be filtered in that way. Similarly, if certain games or contests could only be made available in certain geographic locations that type of filtering could also be applied.

The foregoing is considered as illustrative only of the principles of the invention. Thus, while certain aspects and embodiments of the invention have been described, these have been presented by way of example only and are not intended to limit the scope of the invention. Indeed, the invention described herein may be embodied in a variety of other forms without departing from the spirit of the invention, which invention is defined solely by the claims herein.

We claim:

1. A method of facilitating at least one gaming session between multiple wireless user devices connected to a wireless network, each user device being locationally aware and containing acoustic generating hardware and acoustic listening hardware, the method comprising:
    a. Providing a gaming server connected to the network, said gaming server containing a gaming engine software application capable of serving and facilitating a contest between the users of a plurality of user devices, said gaming engine being operatively connected to
        i. a contest database containing at least one contest package, each contest package comprising:
            1. the necessary data and processor instructions to allow the gaming engine to serve and facilitate a contest between the users of the user devices connected to a gaming session;
            2. contest availability criteria prescribing the users or user devices to whom the contest package can be made available for a gaming session;
        ii. an advertising database containing at least one advertisement package, each advertisement package comprising:
            1. the necessary content to serve an advertisement for display to at least one user device connected to a gaming session;
            2. any advertising availability criteria prescribing the users or user devices to whom the advertising package can be displayed;
    b. Providing a gaming client software application for installation on the user devices, said gaming client capable of the following:
        i. allowing the user of the user device to initiate the broadcast of an acoustic gaming request to other user devices within acoustic range thereof, and transmitting a corresponding gaming session request to the server;
        ii. listening for acoustic gaming requests broadcast by other user devices within acoustic range, and upon receipt and recognition of an acoustic gaming request which is accepted by the user, transmitting a gaming session join request to the server;

iii. receiving details of available contest packages in the contest database based on the application of contest availability criteria;
iv. participating in the play of the contest of the selected contest package, as served or directed by the gaming server on the network; and
v. receiving and displaying to the user of the user device advertising from a compatible advertising package from the advertising database during or after the completion of the selected contest;
c. using the gaming client software on an initiating user device, allowing a user to request a gaming session by broadcast of an acoustic gaming session request to other user devices within acoustic listening range, and transmitting a corresponding gaming session request from the user device to the server including the location of the user device;
d. using the gaming client software on at least one joining user device, listening for the broadcast of an acoustic gaming session request and upon detection of such a request and acceptance of the request by the user of the joining user device, transmitting a gaming session join request to the server including the location of the joining user device;
e. upon receipt of a gaming session request and at least one gaming session join request at the server, selecting a contest package to be played between the initiating user device and the joining user devices based on the application of contest availability parameters;
f. upon selection of a contest package to play, serving the contest of that contest package to the user devices for play; and
g. during or after completion of the selected contest, displaying the advertisement of at least one compatible advertising package from the advertising database to the user of each user device.

2. The method of claim 1 wherein the acoustic generating hardware of at least one user device is a speaker.

3. The method of claim 1 where the acoustic listening hardware of at least one user device is a microphone.

4. The method of claim 1 wherein the server is capable of facilitating more than one gaming session simultaneously.

5. The method of claim 1 wherein the server is connected to more than one wireless network.

6. The method of claim 5 wherein a gaming session includes only wireless devices connected to the same wireless network.

7. The method of claim 5 wherein a gaming session includes wireless devices from connected to more than one wireless network.

8. The method of claim 1 further comprising transmitting contest availability criteria related to the user of a user device to the server along with either a gaming session request or a gaming session join request, for use in the selection of available contest packages.

9. The method of claim 1 further comprising transmitting advertising availability criteria related to the user of a user device to the server along with either a gaming session request or a gaming session join request, for use in the selection of available advertising packages.

10. The method of claim 1 wherein an acoustic gaming session request as broadcast includes encoded identifying information identifying the originating user device, and the acoustic gaming session request being an encoded audible transmission, when received is decoded and the identity of the originating user device is transmitted to the server along with the gaming session join request.

11. The method of claim 1 wherein the contest package to be played is selected by presentation of a list of available contest packages to the users of user devices within the gaming session, from which a contest package can be chosen by the users.

12. The method of claim 1 wherein the contest package to be played is selected by the gaming engine from the list of available and compatible contest packages.

13. The method of claim 1 wherein the contest availability criteria for at least one contest package includes geofence coordinates, prescribing the location within which the contest package can be made available for play based on the location of user devices within a gaming session.

14. The method of claim 1 wherein the advertising availability criteria for at least one advertising package includes geofence coordinates, prescribing the location within which the advertising package can be made available for display to users of user devices within a gaming session.

15. The method of claim 1 wherein upon broadcast of an acoustic gaming session request, the server will provide a fixed period of time within which it will monitor for receipt of a gaming session join request from at least one joining user device.

16. The method of claim 1 wherein upon detection of an acoustic gaming session request by a joining user device, the gaming client software will provide a fixed period of time to the user of the joining user device to accept the gaming request.

17. A method of gaming between multiple wireless user devices connected to a wireless network, each user device being locationally aware and containing acoustic generating hardware and acoustic listening hardware, the method comprising:
a. Providing a gaming server connected to the network, said gaming server containing a gaming engine software application capable of serving and facilitating a contest between the users of a plurality of user devices, said gaming engine being operatively connected to
i. a contest database containing at least one contest package, each contest package comprising:
1. the necessary data and processor instructions to allow the gaming engine to serve and facilitate a contest between the users of the user devices connected to a gaming session;
2. contest availability criteria prescribing the users or user devices to whom the contest package can be made available for a gaming session;
ii. an advertising database containing at least one advertisement package, each advertisement package comprising:
1. the necessary content to serve an advertisement for display to at least one user device connected to a gaming session;
2. any advertising availability criteria prescribing the users or user devices to whom the advertising package can be displayed;
b. Providing a gaming client software application for installation on the user devices, said gaming client capable of the following:
i. allowing the user of the user device to initiate the broadcast of an acoustic gaming request to other user devices within acoustic range thereof, and transmitting a corresponding gaming session request to the server;
ii. listening for acoustic gaming requests broadcast by other user devices within acoustic range, and upon receipt and recognition of an acoustic gaming request which is accepted by the user, transmitting a gaming session join request to the server;
    iii. receiving details of available contest packages in the contest database based on the application of contest availability criteria;
    iv. participating in the play of the contest of the selected contest package, as served or directed by the gaming server on the network; and
    v. receiving and displaying to the user of the user device advertising from a compatible advertising package from the advertising database during or after the completion of the selected contest;
  c. using the gaming client software installed on an initiating user device, allowing a user to request a gaming session by broadcast of an acoustic gaming session request to other user devices within acoustic listening range, and transmitting a corresponding gaming session request from the user device to the server including the location of the user device;
  d. using the gaming client software installed on at least one joining user device, listening for the broadcast of an acoustic gaming session request and upon detection of such a request and acceptance of the request by the user of the joining user device, transmitting a gaming session join request to the server including the location of the joining user device;
  e. upon receipt of a gaming session request and at least one gaming session join request at the server, selecting a contest package to be played between the initiating user device and the joining user devices based on the application of contest availability parameters;
  f. upon selection of a contest package to play, serving the contest of that contest package to the user devices from the server for play; and
  g. during or after completion of the selected contest, displaying the advertisement of at least one compatible advertising package from the advertising database to the user of each user device.

18. A gaming server software application for use in the serving of gaming sessions by a server to groups of wireless user devices connected to at least one wireless network, said gaming server software application comprising processor instructions to cause the hardware of the server to enable the following method:
  a. receipt of gaming session requests transmitted from initiating user devices on the network;
  b. receipt of gaming session join requests transmitted from joining user devices on the network;
  c. based on receipt of a gaming session request and at least one gaming session join request corresponding thereto, facilitating the playing of a contest between the users of the corresponding user devices in a gaming session by selecting a contest package from a contest database operatively connected thereto, containing at least one contest package comprising:
    i. the necessary data and processor instructions to allow the gaming engine to serve and facilitate a contest between the users of the user devices connected to the gaming session; and
    ii. contest availability criteria prescribing the users or user devices to whom the contest package can be made available for a gaming session;
  d. during or following the play of the selected contest within a gaming session, displaying to the user of each user device within the gaming session the advertisement from a selected advertising package from an advertising database operatively connected thereto, the advertising database containing at least one advertisement package comprising:
    i. the necessary content to serve an advertisement for display to at least one user device connected to a gaming session;
    ii. any advertising availability criteria prescribing the users or user devices to whom the advertising package can be displayed.

19. The gaming server software of claim 18 wherein the server is capable of facilitating more than one gaming session simultaneously.

20. The gaming server software of claim 18 wherein contest availability criteria related to the user of a user device are transmitted to the server along with either a gaming session request or a gaming session join request, for use in the selection of available contest packages.

21. The gaming server software of claim 18 wherein advertising availability criteria related to the user of a user device are transmitted to the server along with either a gaming session request or a gaming session join request, for use in the selection of available advertising packages.

22. A gaming client software application for use on a locationally aware wireless user device containing acoustic generating hardware and acoustic listening hardware connected to a wireless network, said gaming client software application capable of communication with a gaming engine software application on the network which will serve and facilitate a contest between the users of a plurality of user devices, said gaming engine being operatively connected to
  a. a contest database containing at least one contest package, each contest package comprising:
    i. the necessary data and processor instructions to allow the gaming engine to serve and facilitate a contest between the users of the user devices connected to a gaming session;
    ii. contest availability criteria prescribing the users or user devices to whom the contest package can be made available for a gaming session; and
  b. an advertising database containing at least one advertisement package, each advertisement package comprising:
    i. the necessary content to serve an advertisement for display to at least one user device connected to a gaming session;
    ii. any advertising availability criteria prescribing the users or user devices to whom the advertising package can be displayed;
  c. wherein the gaming client software application, operable on the processor and hardware of the user device will facilitate the following steps:
    i. based on initiation by the user, broadcasting an acoustic gaming request to other user devices within acoustic range thereof using the acoustic broadcast hardware of the device, and transmitting a corresponding gaming session request to the server which includes the location of the user device being the initiating user device;
    ii. using the acoustic listening hardware of the user device, listening for acoustic gaming requests broadcast by other user devices within acoustic range, and upon detection of an acoustic gaming request allowing the user of that user device to accept the gaming request on the joining user device whereupon a gaming session join request is transmitted to the server which includes the location of the joining user device;
    iii. whereby the initiating user device and at least one joining user device can be joined together by the gaming server in a gaming session for the playing of a contest contained within a contest package in the contest database by the users thereof;

iv. receiving transmission of content and instructions from the gaming server related to a selected contest package, for display to and interaction with the user of the user device in the play of a contest contained in the selected contest package between the users of the user devices within a gaming session; and v. receiving advertising content from a selected advertising package in the advertising database for display to the user of the user device during or following the completion of play of the selected contest by the user.

23. The gaming client software of claim 22 wherein the acoustic generating hardware of the user device is a speaker and the gaming client software will broadcast an acoustic gaming session request by causing the speaker to broadcast an acoustic tone which will be audible to other user devices within acoustic listening range.

24. The gaming client software of claim 23 wherein an identifier of the initiating user device is encoded within the acoustic gaming session request by the gaming client software on a broadcasting user device, which can be decoded by the gaming client software on a listening user device.

25. The gaming client software of claim 22 wherein the acoustic listening hardware of the user device is a microphone and the gaming client software can, using the microphone and other hardware of the user device, listen for the broadcast of acoustic gaming session requests from user devices within acoustic range and receive and decode such acoustic gaming session requests when detected by the microphone and other hardware.

26. The gaming client software of claim 22 where the user of a joining user device is permitted to accept a detected acoustic gaming session request by use of the user interface of the user device.

27. The gaming client software of claim 22, wherein contest availability criteria related to the user of an initiating user device are transmitted to the server along with a gaming session request, for use in the selection of available contest packages.

28. The gaming client software of claim 22, wherein contest availability criteria related to the user of a joining user device are transmitted to the server along with a gaming session join request, for use in the selection of available contest packages.

29. The gaming client software of claim 22, wherein advertising availability criteria related to the user of an initiating user device are transmitted to the server along with a gaming session request, for use in the selection of available advertising packages.

30. The gaming client software of claim 22, wherein advertising availability criteria related to the user of a joining user device are transmitted to the server along with a gaming session join request, for use in the selection of available advertising packages.

31. The gaming client software of claim 22, wherein the contest package to be played is selected by presentation of a list of available contest packages to the users of user devices within the gaming session, from which a contest package can be chosen by the users.

32. The gaming client software of claim 22 wherein upon detection of an acoustic gaming session request by a joining user device, the gaming client software will provide a fixed period of time to the user of the user device to accept the gaming request.

* * * * *